United States Patent
Reunanen et al.

(10) Patent No.: US 11,756,199 B2
(45) Date of Patent: *Sep. 12, 2023

(54) IMAGE ANALYSIS IN PATHOLOGY

(71) Applicant: AIFORIA TECHNOLOGIES OYJ, Helsinki (FI)

(72) Inventors: Juha Reunanen, Helsinki (FI); Liisa-Maija Keinänen, Helsinki (FI); Tuomas Ropponen, Helsinki (FI)

(73) Assignee: AIFORIA TECHNOLOGIES OYJ, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,298

(22) Filed: May 24, 2022

(65) Prior Publication Data

US 2022/0284580 A1 Sep. 8, 2022

Related U.S. Application Data

(63) Continuation of application No. 16/948,976, filed on Oct. 8, 2020, now Pat. No. 11,373,309, which is a
(Continued)

(51) Int. Cl.
*G06T 7/00* (2017.01)
*G06T 1/20* (2006.01)
(Continued)

(52) U.S. Cl.
CPC ............. *G06T 7/0014* (2013.01); *G06T 1/20* (2013.01); *G06V 10/764* (2022.01);
(Continued)

(58) Field of Classification Search
None
See application file for complete search history.

(56) References Cited

U.S. PATENT DOCUMENTS 7,941,275 B2 5/2011 Gholap et al.
8,340,372 B2 12/2012 Watson et al.
(Continued)

FOREIGN PATENT DOCUMENTS

WO 2018165103 A1 9/2018
WO 2019084697 A1 5/2019
(Continued)

OTHER PUBLICATIONS

Ronneberger et al., "U-Net: Convolutional Networks for Biomedical Image Segmentation", [online] retrieved from: https://arxiv.org/abs/1505.04597.pdf, May 18, 2015, pp. 1-8.
(Continued)

*Primary Examiner* — Leon Flores
(74) *Attorney, Agent, or Firm* — Leber IP Law; David C. Robertson

(57) ABSTRACT

A method of facilitating image analysis in pathology involves receiving a sample image representing a sample for analysis, the sample image including sample image elements, causing one or more functions to be applied to the sample image to determine a plurality of property specific confidence related scores, each associated with a sample image element and a respective sample property and representing a level of confidence that the associated element represents the associated sample property, sorting a set of elements based at least in part on the confidence related scores, producing signals for causing one or more of the set of elements to be displayed to a user in an order based on the sorting, for each of the one or more elements displayed, receiving user input, and causing the user input to be used to update the one or more functions. Other methods, systems, and computer-readable media are disclosed.

30 Claims, 24 Drawing Sheets

Related U.S. Application Data continuation of application No. 16/789,047, filed on Feb. 12, 2020, now Pat. No. 10,803,586.

(60) Provisional application No. 62/906,469, filed on Sep. 26, 2019.

(51) Int. Cl.
  *G06V 10/764* (2022.01)
  *G06V 10/778* (2022.01)
  *G06V 10/82* (2022.01)
  *G06V 20/69* (2022.01)

(52) U.S. Cl.
  CPC .......... *G06V 10/7788* (2022.01); *G06V 10/82* (2022.01); *G06V 20/695* (2022.01); *G06V 20/698* (2022.01); *G06T 2207/30024* (2013.01)

(56) References Cited

U.S. PATENT DOCUMENTS

| | | | |
|---|---|---|---|
| 8,351,676 | B2 | 1/2013 | Dai et al. |
| 8,515,683 | B2 | 8/2013 | Gholap et al. |
| 9,208,405 | B2 | 12/2015 | Dai et al. |
| 9,946,953 | B2 | 4/2018 | Tunstall et al. |
| 10,102,418 | B2 | 10/2018 | Bredno et al. |
| 10,176,408 | B2 | 1/2019 | Paik et al. |
| 10,176,579 | B2 | 1/2019 | Chukka et al. |
| 10,262,272 | B2 | 4/2019 | Chickering et al. |
| 10,803,586 | B1 * | 10/2020 | Reunanen ............ G06V 20/698 |
| 11,373,309 | B2 * | 6/2022 | Reunanen ................ G06T 1/20 |
| 2012/0052063 | A1 | 3/2012 | Bhargava et al. |
| 2013/0226548 | A1 | 8/2013 | Beck et al. |
| 2017/0169276 | A1 | 6/2017 | Agaian et al. |
| 2018/0089496 | A1 | 3/2018 | Molin et al. |
| 2018/0232883 | A1 | 8/2018 | Sethi et al. |
| 2018/0374210 | A1 | 12/2018 | Barker et al. |

FOREIGN PATENT DOCUMENTS

| | | |
|---|---|---|
| WO | 2019104003 A1 | 5/2019 |
| WO | 2019110583 A1 | 6/2019 |

OTHER PUBLICATIONS

Du et al., "Breast Cancer Histopathological Image Classification via Deep Active Learning and Confidence Boosting", Artificial Neural Networks and Machine Learning—ICANN 2018, Lecture Notes in Computer Science, vol. 11140, 2018, pp. 110-116.

Qi et al., "Label-Efficient Breast Cancer Histopathological Image Classification", IEEE Journal of Biomedical and Health Informatics, vol. XX, No. X, 2018, pp. 1-9.

Lubrano Di Scandalea et al., "Deep Active Learning for Axon-Myelin Segmentation on Histology Data", [online] retrieved from: https://arxiv.org/pdf/1907.05143.pdf, Jul. 11, 2019, pp. 1-8.

Ghiasi et al., "DropBlock: A regularization method for convolutional networks", 32nd Conference on Neural Information Processing Systems (NeurIPS 2018), 2018, pp. 1-11.

Gal, "What My Deep Model Doesn't Know", [online] retrieved from: http://mlg.eng.cam.ac.uk/yarin/blog_3d801aa532c1ce.html, Jul. 3, 2015, accessed Sep. 10, 2019, 23 pages.

Wikipedia, "Bilinear Interpolation", [online] received from: https://en.wikipedia.org/wiki/Bilinear_interpolation, accessed Sep. 4, 2019, 3 pages.

Al-Milaji et al., "Integrating Segmentation with Deep Learning for Enhanced Classification of Epithelial and Stromal Tissues in H&E Images", Pattern Recognition Letters, vol. 119, Mar. 1, 2019, pp. 214-221.

Harmon et al., "Artificial intelligence at the intersection of pathology and radiology in prostate cancer", Diagnostic and Interventional Radiology, vol. 25, Issue 3, May-Jun. 2019, published online Apr. 12, 2019, 11 pages.

International Patent Application No. PCT/FI2020/050621, International Search Report and Written Opinion dated Dec. 23, 2020, 14 pages.

* cited by examiner

280

Score record

282 — Property identifier    0

284 {
Pixel square 1 score    -3.1
Pixel square 2 score    -3.2
...
Pixel square 325,521,875 score    3.9
}

Score record

Property identifier    1
Pixel square 1 score    1.1
Pixel square 2 score    1.0
...
Pixel square 325,521,875 score    -1.3

Score record

Property identifier    2
Pixel square 1 score    2.0
Pixel square 2 score    2.2
...
Pixel square 325,521,875 score    -2.6

Largest score record

422 {
Pixel square 1 score          2.0
Pixel square 2 score          2.2
...
Pixel square 325,521,875 score   3.9

440

Sorted pixel squares record

442 {
444 — Pixel square ID 1        86,943,413
446 — Pixel square ID 2        176,644,727
...
448 — Pixel square ID 100      156,739,554

480

Second largest score record

| | |
|---|---|
| Pixel square 1 score | 1.1 |
| Pixel square 2 score | 1.0 |
| ... | |
| Pixel square 325,521,875 score | -1.3 |

Sorted pixel squares record

| | |
|---|---|
| Pixel square ID 1 | 21,478,784 |
| Pixel square ID 2 | 180,720,503 |
| ... | |
| Pixel square ID 100 | 122,521,290 |

Final sorted pixel squares record

542 — Pixel square ID 1      86,943,413

Final sorted pixel squares record

Pixel square ID 1      86,943,413
544 — Pixel square ID 2      21,478,784

Final sorted pixel squares record

542 — Pixel square ID 1      86,943,413
544 — Pixel square ID 2      21,478,784
...
Pixel square ID 180      23,578,806

User confirmed pixel record

642 — Pixel ID 1     8,694,341,384
644 — Property     1
Pixel ID 2     8,694,341,385
Property     1
...

User confirmed pixel square record

| | |
|---|---|
| Pixel square 1 x-coordinate | 278,889 |
| Pixel square 1 y-coordinate | 27,826 |
| Property | 1 |
| Pixel square 2 x-coordinate | 278,892 |
| Pixel square 2 y-coordinate | 27,826 |
| Property | 1 |

...

680

Score record

| | | |
|---|---|---|
| 682 — | Property identifier | 3 |
| 684 — | Object 1 coordinate x | 102,674 |
| 686 — | Object 1 coordinate y | 24,173 |
| 688 — | Object 1 score | 4.1 |
| | Object 2 coordinate x | 189,217 |
| | Object 2 coordinate y | 10,583 |
| | Object 2 score | 0.9 |
| | ... | |

Positive score record

| | |
|---|---|
| Property identifier | 3 |
| Object 1 coordinate x | 73,233 |
| Object 1 coordinate y | 30,084 |
| Object 1 score | 0.1 |
| Object 2 coordinate x | 94,943 |
| Object 2 coordinate y | 79,391 |
| Object 2 score | 0.1 |

Negative score record

| | |
|---|---|
| Property identifier | 3 |
| Object 1 coordinate x | 41,163 |
| Object 1 coordinate y | 94,760 |
| Object 1 score | -0.1 |
| Object 2 coordinate x | 79,037 |
| Object 2 coordinate y | 51,596 |
| Object 2 score | -0.1 |

Final sorted objects record

| | |
|---|---|
| Object 1 coordinate x | 73,233 |
| Object 1 coordinate y | 30,084 |
| Object 2 coordinate x | 41,163 |
| Object 2 coordinate y | 94,760 |
| ... | |

880

User confirmed record

| | | |
|---|---|---|
| 882 — | Object 1 coordinate x | 73,233 |
| 884 — | Object 1 coordinate y | 30,084 |
| 886 — | Object 1 property ID | 3 |
| | Object 2 coordinate x | 74,900 |
| | Object 2 coordinate y | 32,239 |
| | Object 2 property ID | 4 |
| | ... | |

Group score record

| | | |
|---|---|---|
| 962 — | Object 1 coordinate x | 102,674 |
| 964 — | Object 1 coordinate y | 41,731 |
| 966 — | Object 1 group score | 0.1 |
| 968 — | Object 1 property ID | 3 |

IMAGE ANALYSIS IN PATHOLOGY

RELATED APPLICATION

This application is a continuation application of U.S. patent application Ser. No. 16/948,976, filed Oct. 8, 2020, which is a continuation of U.S. patent application Ser. No. 16/789,047, filed Feb. 12, 2020, now U.S. Pat. No. 10,803,586, issued on Oct. 13, 2020, which claims the benefit of U.S. Provisional Application No. 62/906,469 entitled "IMAGE ANALYSIS IN PATHOLOGY", filed on Sep. 26, 2019, the entire contents of which are hereby incorporated by reference.

BACKGROUND

1. Field

Embodiments of this invention relate to image analysis and more particularly to image analysis in pathology.

2. Description of Related Art

Image analysis is playing an increasing role globally in pathology and various medical diagnostic applications. Such image analysis may rely on expert resources to review and analyze images. However, expert resources for image analysis may be limited and/or costly. Some known systems for enabling image analysis in pathology may not use expert resources effectively and/or efficiently, which may result in slow, costly, and/or inaccurate results.

SUMMARY

In accordance with various embodiments, there is provided a method of facilitating image analysis in pathology. The method involves receiving a sample image representing a sample for analysis in pathology, the sample image including a plurality of sample image elements, causing one or more functions to be applied to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property, sorting a set of sample image elements of the plurality of sample image elements based at least in part on the property specific confidence related scores associated with the set of sample image elements, producing signals for causing one or more of the set of sample image elements to be displayed to a user in an order based on the sorting, for each of the one or more sample image elements displayed, receiving user input, and causing the user input to be used to update the one or more functions.

The user input may include a user-provided indication that the sample image element represents one of the one or more sample properties.

The set of sample image elements may include two or more sample image elements and the one or more of the set of sample image elements displayed may include two or more of the set of sample image elements.

Producing signals for causing the one or more of the set of sample image elements to be displayed to the user may involve, for at least one of the one or more of the set of sample image elements to be displayed to the user, producing signals for causing at least one contextual sample image element proximate to the sample image element to be displayed to the user with the sample image element.

The method may involve, for each of the contextual sample image elements, receiving contextual user input including a user-provided indication that the contextual sample image element represents one of the one or more sample properties, and causing the contextual user input to be used to update the one or more functions.

Sorting the set of sample image elements may involve, for at least one of the set of sample image elements, identifying at least one contextual sample image element to be displayed with the sample image element, and determining a group score based at least in part on the property specific confidence related score of the identified at least one contextual sample image element and the sample image element, and sorting the set of sample image elements may involve sorting based at least in part on the determined group scores.

Determining the group score may involve comparing respective property specific confidence related scores associated with each of the identified at least one contextual sample image element and the sample image element.

Causing the one or more functions to be applied to the sample image to determine the property specific confidence related scores may involve causing the one or more functions to determine more than one related property specific confidence related score associated with each of the sample image elements.

The more than one related property specific confidence related scores associated with each of the sample image elements may be associated with properties that are mutually exclusive.

Sorting the set of sample image elements may involve identifying, for each sample image element of the set of sample image elements, a largest property specific confidence related score of the more than one related property specific confidence related scores associated with the sample image element and sorting based at least in part on the largest property specific confidence related scores.

Sorting based at least in part on the largest property specific confidence related scores may involve sorting in ascending order of the largest property specific confidence related scores associated with each of the sample image elements and producing signals for causing the one or more sample image elements to be displayed to the user may involve producing signals for causing sample image elements associated with lower largest property specific confidence related scores to be displayed first.

Sorting the set of sample image elements may involve identifying, for each sample image element of the set of sample image elements, a second largest property specific confidence related score of the more than one related property specific confidence related scores associated with the sample image element and sorting based at least in part on the second largest property specific confidence related scores.

Sorting based at least in part on the second largest property specific confidence related scores may involve sorting in descending order of the second largest property specific confidence related scores associated with each of the sample image elements and producing signals for causing the one or more sample image elements to be displayed to the user may involve producing signals for causing sample image elements associated with higher second largest property specific confidence related scores to be displayed first.

Sorting the set of sample image elements may involve determining, for each of the set of sample image elements, a difference between the property specific confidence related score associated with the sample image element and a property specific confidence related threshold and sorting the set of sample image elements based at least in part on the determined differences.

Sorting the set of sample image elements may involve sorting the set of sample image elements into a plurality of sorted lists and generating a final sorted list from the plurality of sorted lists, wherein generating the final sorted list involves adding sample image elements to the final sorted list from each of the plurality of sorted lists.

Adding the sample image elements to the final sorted list from each of the plurality of sorted lists may involve adding the sample image elements alternatingly from each of the plurality of sorted lists.

The method may involve determining, for each of the set of sample image elements, whether the sample image element is within a threshold proximity of at least one earlier sorted sample image element.

Applying the one or more functions to the sample image to determine the plurality of property specific confidence related scores may involve, for each of the sample image elements, applying at least one of the one or more functions to a respective subimage included in the sample image and including the sample image element, and disregarding the rest of the sample image, each of the subimages having a width and height less than a width and height of the sample image.

Producing signals for causing the one or more sample image elements to be displayed to the user may involve producing signals for causing the one or more sample image elements to be displayed in one or more subimage size based review images showing a portion of the sample image, each of the one or more subimage size based review images having a width about 1 to 10 times the width of the subimages and having a height about 1 to 10 times the height of the subimages.

Producing signals for causing the one or more sample image elements to be displayed to the user may involve producing signals for causing at least one of the one or more sample image elements to be displayed in a sample image element size based review image showing a portion of the sample image having a width and a height about 10 to 20 times a diameter of the at least one of the one or more sample image elements.

The one or more functions may include one or more neural network functions and causing the user input to be used to update the one or more functions may involve causing the user input to be used to train the one or more neural network functions.

The sample image elements may include sets of adjacent pixels.

The sample image elements may include groups of pixels identified as objects.

In accordance with various embodiments, there is provided a system for facilitating image analysis in pathology, the system comprising at least one processor configured to perform any of the above methods.

In accordance with various embodiments, there is provided a non-transitory computer-readable medium having stored thereon codes that when executed by at least one processor cause the at least one processor to perform any of the above methods.

BRIEF DESCRIPTION OF THE DRAWINGS

In drawings which illustrate embodiments of the invention,

FIG. 7 is a representation of an exemplary score record that may be used in the system shown in FIG. 1, in accordance with various embodiments;

FIG. 8 is a representation of an exemplary score record that may be used in the system shown in FIG. 1, in accordance with various embodiments;

FIG. 9 is a representation of an exemplary score record that may be used in the system shown in FIG. 1, in accordance with various embodiments;

FIG. 13 is a representation of an exemplary second largest score record that may be used in the system shown in FIG. 1, in accordance with various embodiments;

FIG. 14 is a representation of an exemplary sorted pixel squares record that may be used in the system shown in FIG. 1, in accordance with various embodiments;

FIG. 16 is a representation of an exemplary final sorted pixel squares record that may be used in the system shown in FIG. 1, in accordance with various embodiments;

FIG. 17 is a representation of an exemplary final sorted pixel squares record that may be used in the system shown in FIG. 1, in accordance with various embodiments;

FIG. 18 is a representation of an exemplary final sorted pixel squares record that may be used in the system shown in FIG. 1, in accordance with various embodiments;

FIG. 21 is a representation of an exemplary user confirmed pixel record that may be used in the system shown in FIG. 1, in accordance with various embodiments;

FIG. 23 is a representation of an exemplary score record that may be used in the system shown in FIG. 1, in accordance with various embodiments;

FIG. 25 is a representation of an exemplary positive score record that may be used in the system shown in FIG. 1, in accordance with various embodiments;

FIG. 26 is a representation of an exemplary negative score record that may be used in the system shown in FIG. 1, in accordance with various embodiments;

FIG. 29 is a representation of an exemplary user confirmed record that may be used in the system shown in FIG. 1, in accordance with various embodiments;

DETAILED DESCRIPTION

Figure 1:
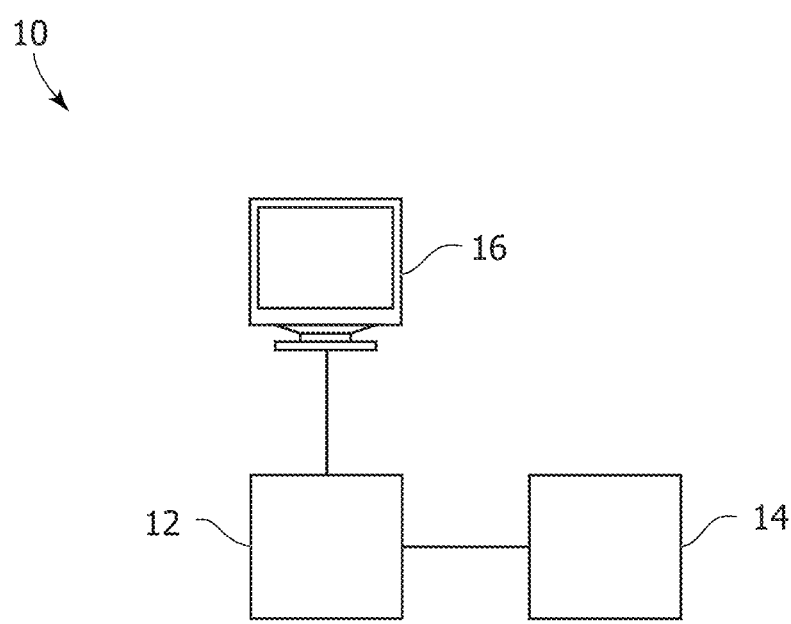
FIG. 1 is a schematic view of a system for facilitating image analysis in pathology, according to various embodiments.

Referring to FIG. 1, there is provided a system 10 for facilitating image analysis in pathology in accordance with various embodiments. The system 10 includes an image analyzer 12 in communication with an image source 14 and a display 16. In various embodiments, the system 10 may facilitate effective and efficient use of human expert input in providing fast, effective, and efficient image analysis in pathology. In various embodiments, the system 10 may enable the provision of versatile and scalable solutions for medical research, drug development, and/or diagnostics, for example.

Referring to FIG. 1, in some embodiments, the image analyzer 12 may be configured to solicit feedback from users or experts via the display 16 to facilitate training of one or more functions, such as one or more neural networks, for example, that may be used to identify pathology relevant properties for various image elements included in a sample image. For example, in some embodiments, the sample image may include a microscope image of patient tissue and the properties identified may include a determination that various image elements or portions of the image represent epithelial tissue cells, a portion of stroma, or neither. In some embodiments, the epithelial tissue cells may be tumor epithelial tissue cells. In some embodiments, the image analyzer 12 may be configured to solicit feedback such that user efforts may be used in an efficient and effective manner. For example, in some embodiments, the image analyzer 12 may be configured to solicit feedback regarding image elements which are most likely to be mischaracterized by the one or more functions or neural networks, and this may facilitate efficient and effective training of the one or more functions.

Figure 2:
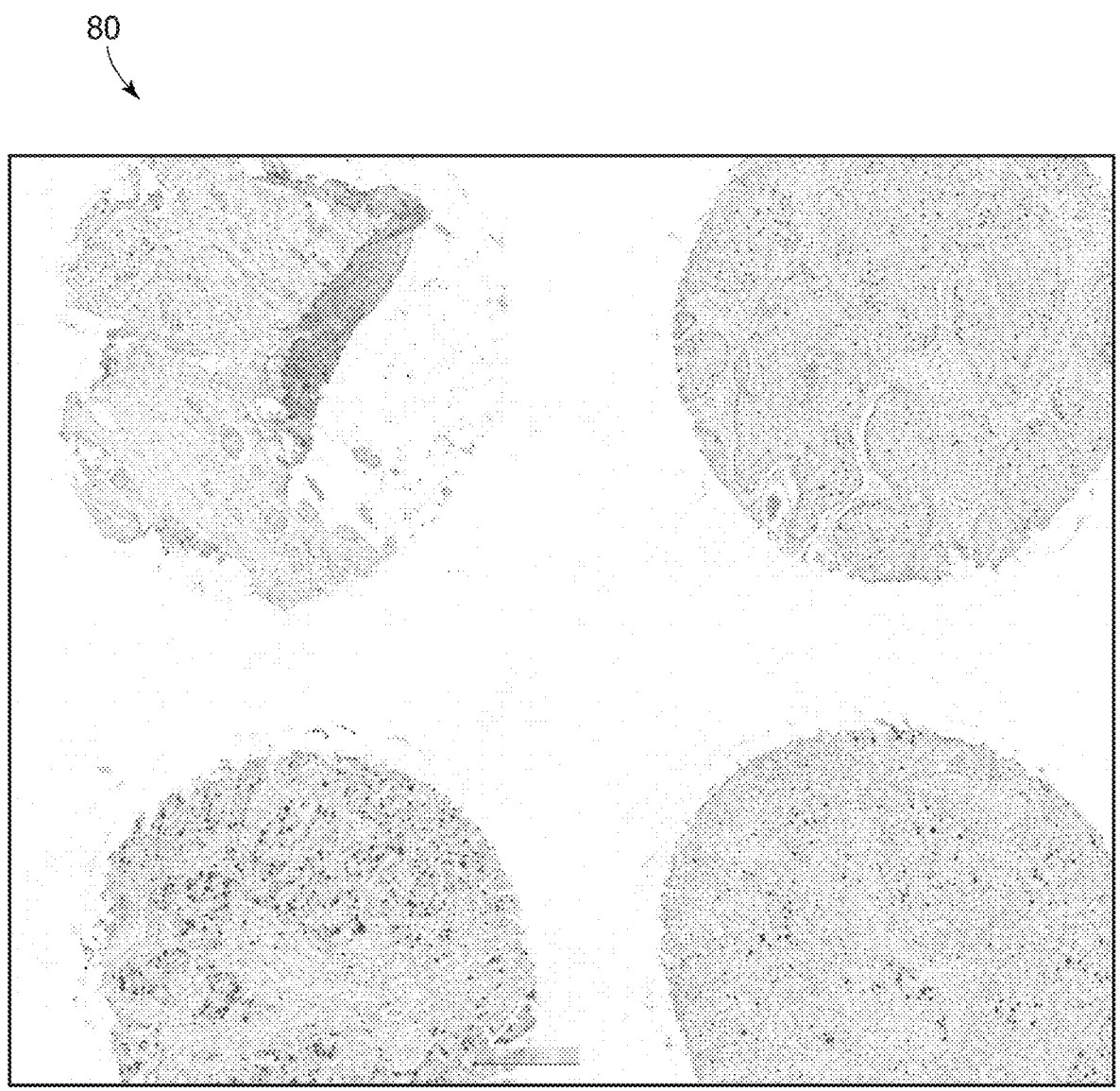
FIG. 2 is a representation of a sample image that may be used in the system shown in FIG. 1, in accordance with various embodiments.

In some embodiments, the image analyzer 12 may be configured to facilitate training of one or more functions configured to identify properties represented by sample image elements included in a sample image 80 shown in FIG. 2, for example. For example, the image analyzer 12 may be configured to facilitate training of a neural network configured to categorize pixels or groups of pixels included in the sample image 80. For example, in some embodiments, the sample image 80 may depict various types of tissue or cells and the image analyzer 12 may be configured to facilitate training of a neural network configured to identify the types of tissue included in the sample image 80. In some embodiments, the neural network may be configured to perform semantic segmentation to determine that pixels included in the sample image 80 represent epithelial tissue, stroma, or neither, for example. In various embodiments, this identification may be useful in pathology, for example, for further diagnostics of the identified tissue and/or in deriving statistics or metrics associated with the identified tissue.

In some embodiments, the image analyzer 12 may be configured to receive a sample image representing a sample for analysis in pathology, the sample image including a plurality of sample image elements. In some embodiments, for example, the image source 14 may be configured to provide to the image analyzer 12 the sample image 80 as shown in FIG. 2, which includes representations of epithelial tissue or cells taken from a patient.

In various embodiments, sample image elements included in the sample image 80 may include pixels and/or groups of pixels, which may be identifiable as objects or instances or parts of a studied feature, for example. In some embodiments, the sample image 80 may be broken down into a matrix or grid of groups of pixels, each group being a set of adjacent pixels such as a 10 pixel×10 pixel square, for example, which may be referred to herein as a pixel square and may act as a sample image element. In various embodiments, the image analyzer 12 may store a representation of the sample image 80 in storage memory for analysis.

In various embodiments, the image analyzer 12 may cause one or more functions to be applied to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property. In some embodiments, the one or more functions may include one or more neural network functions and the image analyzer 12 may apply the one or more neural network functions to the sample image 80.

In some embodiments, the one or more functions may determine more than one related property specific confidence related score to be associated with each of the sample image elements. For example, in some embodiments, the one or more sample properties may include "represents epithelial tissue", "represents at least a portion of stroma", and "does not represent part of epithelial tissue or stroma", and the one or more functions may include a neural network function for determining first, second, and third scores for each pixel square included in the sample image 80, the first score related to or meant to represent a level of confidence that the pixel square represents epithelial tissue, the second score related to or meant to represent a level of confidence that the pixel square represents at least a portion of stroma and the third score related to or meant to represent a level of confidence that the pixel square does not represent stroma or epithelial tissue. In some embodiments, the neural network function may have been previously trained using expert evaluation of a plurality of previously provided sample images.

Accordingly, in various embodiments, first, second, and third scores may be determined and associated with each pixel square of the sample image 80, the first score associated with the property, "represents epithelial tissue" and representing a level of confidence that the associated pixel square represents epithelial tissue, the second score associated with the property, "represents at least a portion of stroma" and representing a level of confidence that the associated pixel square represents at least a portion of stroma, and the third score associated with the property "does not represent epithelial tissue or stroma" and representing a level of confidence that the associated pixel square does not represent epithelial tissue or stroma. The image analyzer 12 may store the first, second, and third scores for each pixel square in storage memory.

In various embodiments, the image analyzer 12 may then sort a set of sample image elements of the plurality of sample image elements based at least in part on the property specific confidence related scores associated with the set of sample image elements. In various embodiments, the sorting may involve sorting two or more sample image elements such that sample image elements which are more likely to be mischaracterized by the one or more functions are sorted ahead of other sample image elements. For example, in some embodiments, the image analyzer 12 may generate a list of pixel squares included in the sample image 80 such that pixel squares in the list which are more likely to have been mischaracterized by the one or more functions are sorted ahead of other pixel squares.

In some embodiments, the image analyzer 12 may store one or more sorted lists of sample image elements in storage memory. In some embodiments, the image analyzer 12 may generate and store in memory a final list of sample image elements by adding sample image elements to the final sorted list from a plurality of sorted lists. For example, in some embodiments, the image analyzer 12 may generate the final list by interleaving the results of the lists, the final list including elements added from the two or more lists alternatingly.

In various embodiments, the image analyzer 12 may then produce signals for causing one or more of the set of sample image elements to be displayed to a user in an order based on the sorting. In some embodiments, such as, for example where the final list has been generated, the image analyzer 12 may produce signals for causing the pixel squares from the final list to be displayed to the user in order according to the final list. In some embodiments, this may result in sample image elements which are more likely to have been mischaracterized being displayed early or first. In various embodiments, displaying a pixel square may involve displaying a representation of the pixels included in the pixel square.

In various embodiments, the image analyzer 12 may produce signals for causing a subject pixel square to be displayed to the user in respective review images or windows, depicting portions of the sample image, which may include additional pixels and/or pixel squares surrounding the subject pixel square, such that the additional pixels and/or pixel squares may provide context and/or can be classified by the user. Accordingly, in various embodiments, the image analyzer 12 may, for each of the one or more of the set of sample image elements to be displayed to the user, produce signals for causing at least one contextual sample image element proximate to the sample image element to be displayed to the user with the sample image element.

In various embodiments, displaying proximate sample image elements, such as pixels or pixel squares, may allow the user or expert a better understanding of the subject sample image element or pixel square. In some embodiments, the user or expert may provide user input for classifying the contextual sample image elements in addition to user input including information/confirmation regarding the subject sample image element, even though the contextual sample image element may not be considered as likely to be mischaracterized. In various embodiments, this may provide various advantages, such as, for example, allowing the user to provide some less difficult feedback, which may increase the confidence of the user, and/or enabling the one or more functions to be updated or trained based on sample image elements which were sorted with higher confidence, which may increase the speed of training and/or accuracy of the one or more functions.

In various embodiments, the image analyzer 12 may, for each of the one or more sample image elements displayed, receive user input. In some embodiments, the user input may include a user-provided indication that sample image elements being displayed to the user represent one of the one or more sample properties. For example, in some embodiments, the user may review a displayed image including the subject sample image element or pixel square along with other pixels and/or pixel squares and provide feedback regarding whether each of the pixels included in the displayed pixel squares and/or pixels represents epithelial tissue, at least a portion of stroma, or neither. In some embodiments, the user may interact with the display 16 using a pointer, such as a mouse, for example, and may draw or update a polygon depicting which pixels are and are not representative of epithelial tissue, for example. In various embodiments, the user may provide further user input each time a sample image element is displayed.

In various embodiments, this user-provided indication that particular displayed pixels represent sample properties may be later interpreted by the image analyzer 12 as user-provided indications that corresponding pixel squares represent sample properties. For example, in some embodiments, the pixels displayed to the user may be partitioned or grouped into pixel squares, which may act as user confirmed pixel squares, and each user confirmed pixel square may be considered to be classified by the user input as representing a sample property for which the most pixels within the pixel square were associated by the user input.

In some embodiments, the image analyzer 12 may save an integer result for each of the pixels that was displayed to the user, as an index of the corresponding class or property confirmed by the user as being associated with the pixel including, for example: 0=no epithelium; 1=epithelium; and 2=stroma, such that during training, pixel squares may be defined and associated with corresponding properties, and gradients may be computed depending on the indices.

The image analyzer 12 may then cause the user input to be used to update the one or more functions. In some embodiments, the image analyzer 12 may define a plurality of user confirmed pixel squares as respective groups of pixels for which user input was provided and the image analyzer 12 may associate each user confirmed pixel square with a sample property. In some embodiments, the image analyzer may associate each user confirmed pixel square with the sample property that is most prevalent within the pixel squares included in the user confirmed pixel square, for example. In some embodiments, the image analyzer 12 may store in storage memory an updated training data set associating respective sample properties with each of the user confirmed pixel squares.

In some embodiments, the image analyzer 12 may store in memory an integer result for each of the user confirmed pixel squares, as an index of the corresponding class or property confirmed as being associated with the pixel square including, for example: 0=no epithelium; 1=epithelium; and 2=stroma, such that during training, gradients may be computed depending on the saved index. In various embodiments, the user confirmed pixel squares and their associated indices may be included in updated training data.

The image analyzer 12 may then cause the updated training data to be used to train the one or more neural networks previously applied to the sample image 80, for example. In various embodiments, the image analyzer 12 may use the user confirmed pixel squares and associated indices, as stored in memory, as part of the training data and may cause the one or more neural networks previously applied to the sample image 80 to be updated based on the training data.

In various embodiments, the set of sample image elements sorted may include a plurality of sample image elements and the sample image elements displayed to the user in order based on the sorting may also include a plurality of sample image elements. In various embodiments, sorting and displaying multiple image elements may provide various advantages, such as, for example, capturing the most important user input early while allowing the user to end their user input after reviewing a desired number of sample image elements.

In some embodiments, additional or alternative sample image elements other than pixel squares may be analyzed and associated with properties generally as described above. In some embodiments, individual pixels may act as sample image elements. In some embodiments, groups of pixels or groups of pixel squares that may be identified as objects within the sample image 80 may also or alternatively act as sample image elements, for which a user may provide user input confirming associated properties, for example.

Image Analyzer—Processor Circuit

Figure 3:
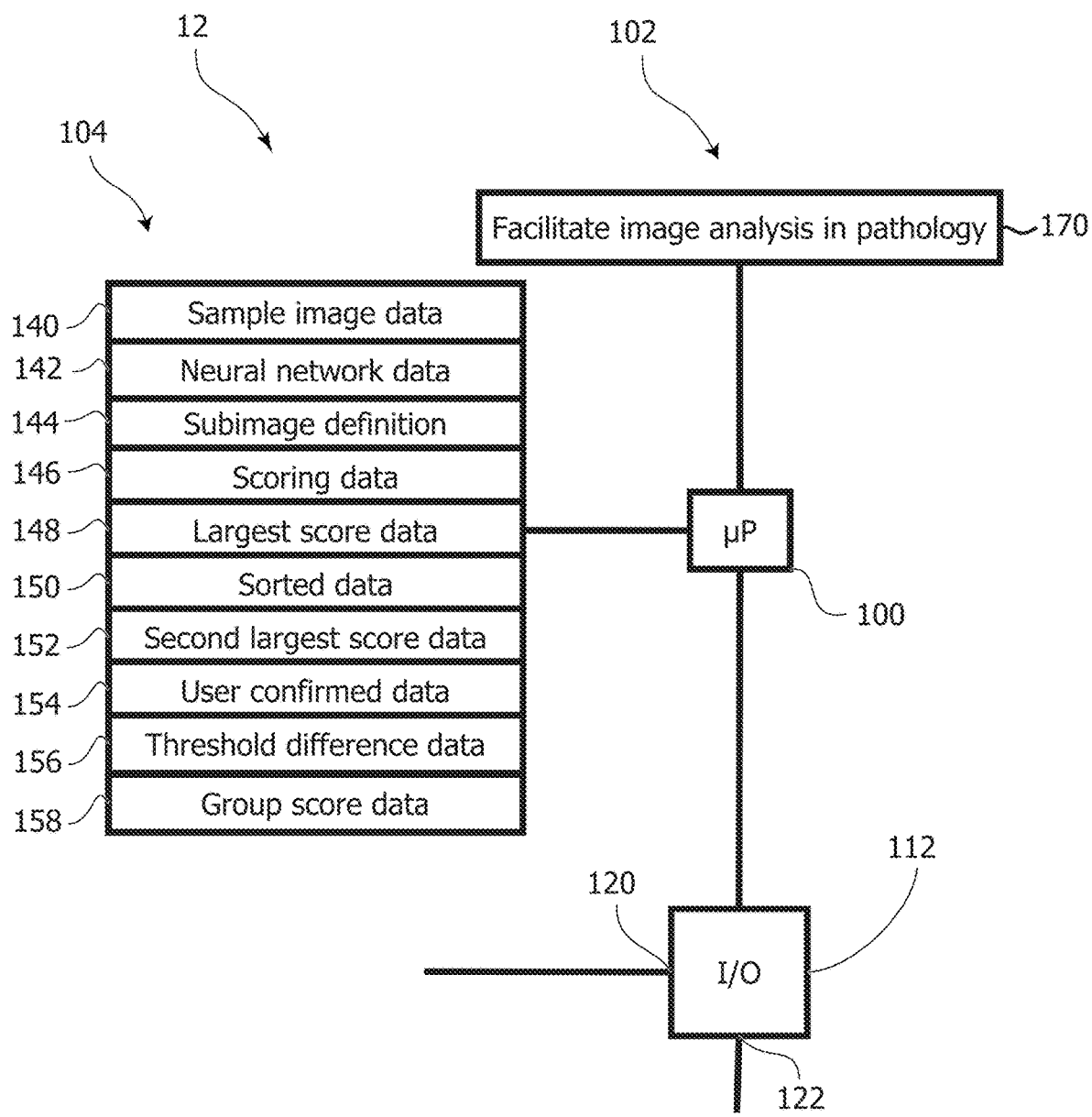
FIG. 3 is a schematic view of an image analyzer of the system shown in FIG. 1, including a processor circuit, in accordance with various embodiments.

Referring now to FIG. 3, a schematic view of the image analyzer 12 of the system 10 shown in FIG. 1 according to various embodiments is shown. Referring to FIG. 3, the image analyzer 12 includes a processor circuit including an analyzer processor 100 and a program memory 102, a storage memory 104, and an input/output (I/O) interface 112, all of which are in communication with the analyzer processor 100. In various embodiments, the analyzer processor 100 may include one or more processing units, such as for example, a central processing unit (CPU), a graphical processing unit (GPU), and/or a field programmable gate array (FPGA). In some embodiments, any or all of the functionality of the image analyzer 12 described herein may be implemented using one or more FPGAs.

The I/O interface 112 includes an interface 120 for communicating with the image source 14 and an interface 122 for communicating with the display 16. In some embodiments, the I/O interface 112 may also include an additional interface for facilitating networked communication through a network such as the Internet. In some embodiments, any or all of the interfaces 120 and/or 122 may facilitate wireless or wired communication. In some embodiments, each of the interfaces shown in FIG. 3 may include one or more interfaces and/or some or all of the interfaces included in the I/O interface 112 may be implemented as combined interfaces or a single interface.

In some embodiments, where a device is described herein as receiving or sending information, it may be understood that the device receives signals representing the information via an interface of the device or produces signals representing the information and transmits the signals to the other device via an interface of the device.

Processor-executable program codes for directing the analyzer processor 100 to carry out various functions are stored in the program memory 102. Referring to FIG. 3, the program memory 102 includes a block of codes 170 for directing the image analyzer 12 to perform facilitating image analysis in pathology functions. In this specification, it may be stated that certain encoded entities such as applications or modules perform certain functions. Herein, when an application, module or encoded entity is described as taking an action, as part of, for example, a function or a method, it will be understood that at least one processor (e.g., the analyzer processor 100) is directed to take the action by way of programmable codes or processor-executable codes or instructions defining or forming part of the application.

The storage memory 104 includes a plurality of storage locations including location 140 for storing sample image data, location 142 for storing neural network data, location 144 for storing subimage definition data, location 146 for storing scoring data, location 148 for storing largest score data, location 150 for storing sorted data, location 152 for storing second largest score data, location 154 for storing user confirmed data, location 156 for storing threshold difference data, and location 158 for storing group score data. In various embodiments, the plurality of storage locations may be stored in a database in the storage memory 104.

In various embodiments, the block of codes 170 may be integrated into a single block of codes or portions of the block of codes 170 may include one or more blocks of code stored in one or more separate locations in the program memory 102. In various embodiments, any or all of the locations 140-158 may be integrated and/or each may include one or more separate locations in the storage memory 104.

Each of the program memory 102 and storage memory 104 may be implemented as one or more storage devices including random access memory (RAM), a hard disk drive (HDD), a solid-state drive (SSD), a network drive, flash memory, a memory stick or card, any other form of non-transitory computer-readable memory or storage medium, and/or a combination thereof. In some embodiments, the program memory 102, the storage memory 104, and/or any portion thereof may be included in a device separate from the image analyzer 12 and in communication with the image analyzer 12 via the I/O interface 112, for example. In some embodiments, the functionality of the analyzer processor 100 and/or the image analyzer 12 as described herein may be implemented using a plurality of processors and/or a plurality of devices.

Analyzer Operation

Figure 4:
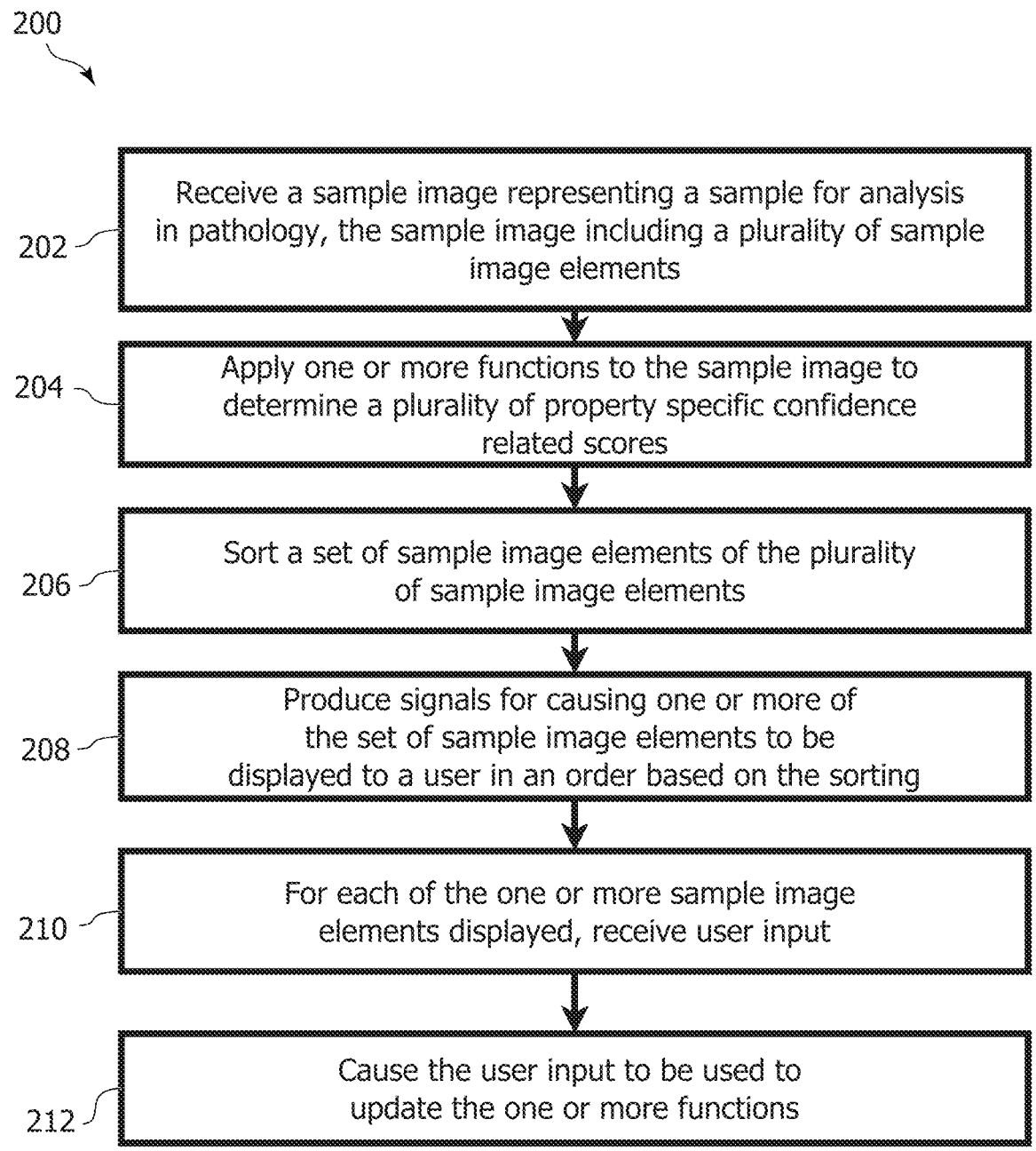
FIG. 4 is a flowchart depicting blocks of code for directing the image analyzer shown in FIG. 3 to perform facilitating image analysis in pathology functions, in accordance with various embodiments.

As discussed above, in various embodiments, the image analyzer 12 shown in FIGS. 1 and 3 may be configured to facilitate image analysis in pathology. Referring to FIG. 4, a flowchart depicting blocks of code for directing the analyzer processor 100 shown in FIG. 3 to perform facilitating image analysis in pathology functions in accordance with various embodiments is shown generally at 200. The blocks of code included in the flowchart 200 may be encoded in the block of codes 170 of the program memory 102 shown in FIG. 3, for example.

Referring to FIG. 4, the flowchart 200 begins with block 202 which directs the analyzer processor 100 to receive a sample image representing a sample for analysis in pathology, the sample image including a plurality of sample image elements. In various embodiments, block 202 may direct the analyzer processor 100 to receive the sample image 80 from the image source 14 via the interface 120 of the I/O interface 112 shown in FIG. 3, for example. In various embodiments, the sample image 80 may include a plurality of pixels, each pixel including at least one pixel value associated with a position in the sample image 80. In some embodiments, the sample image 80 may be able to broken down into a matrix or grid of groups of pixels, each group being a set of adjacent pixels, such as a square region of 10 pixels×10 pixels in the sample image 80. In various embodiments, the pixel squares may each act as a sample image element included in the sample image 80. Block 202 may direct the image analyzer 12 to store a representation of the sample image 80 in the location 140 of the storage memory 104 shown in FIG. 3.

In some embodiments, the sample image 80 shown in FIG. 2 may be a microscope slide image of tissue taken from a subject, for which identification of biomarkers and/or cell types may be made. In some embodiments, the subject may be a patient for which a diagnosis may be made or aided through identification of biomarkers and/or cell types.

Referring to FIG. 4, block 204 directs the analyzer processor 100 to apply one or more functions to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property. In some embodiments, the one or more functions may include one or more neural network functions and block 204 may direct the image analyzer 12 to apply the one or more neural network functions to the sample image 80.

In some embodiments, the one or more functions may include an epithelial tissue and portion of stroma detecting neural network for determining first, second, and third scores for each of a plurality of pixel squares included in the sample image 80, the first score related to or meant to represent a level of confidence that the pixel square represents epithelial tissue, the second score related to or meant to represent a level of confidence that the pixel square represents at least a portion of stroma and a third score related to or meant to represent a level of confidence that the pixel square does not represent stroma or epithelial tissue. In such embodiments, the sample properties may thus be "represents epithelial tissue", "represents a portion of stroma", and "does not represent epithelial tissue or stroma". In various embodiments, the first, second, and third scores acting as property specific confidence related scores may be related, for example, because the properties that they are associated with are generally mutually exclusive (i.e., a pixel square should be categorizable as only one of epithelial tissue, stroma, or neither epithelial tissue nor stroma). In some embodiments, because the related scores are generally mutually exclusive, for each pixel square, generally when one of the related scores is high, the other scores may be likely to be low.

In some embodiments, data defining the epithelial tissue and portion of stroma detecting neural network may be stored in the location 142 of the storage memory 104. In some embodiments, the data defining the epithelial tissue and portion of stroma detecting neural network may have been previously defined or determined during previous training using expert evaluation of a plurality of sample images. In some embodiments, the epithelial tissue and portion of stroma detecting neural network may have a U-net architecture.

In various embodiments, the sample image 80 may be a large image such as for example, a gigapixel image (including about 5-33 gigapixels, for example), which may be difficult and/or time consuming to process using a function or neural network. Accordingly, in various embodiments, block 204 may direct the analyzer processor 100 to take various steps to reduce processing time and increase efficiency when applying the one or more functions to the sample image.

As discussed above, in some embodiments, block 204 may direct the analyzer processor 100 to use pixel squares or groups of adjacent pixels instead of individual pixels, as sample image elements and cause the one or more functions to be applied to the groups of pixels. For example, in some embodiments, block 204 may direct the analyzer processor 100 to break the sample image 80 into a matrix or grid of pixel squares, which may for example each have dimensions of 10 pixels×10 pixels, and may each act as a sample image element. In some embodiments, block 204 may direct the analyzer processor 100 to determine an average pixel value for each pixel square and to use the average pixel values as inputs for the one or more functions. In some embodiments, a median value may be used instead of the average value. In some embodiments, a maximum value may be used instead of the average value. In some embodiments, using the maximum value may be useful in the context of immunofluorescence images, for example.

In various embodiments, using groups of pixels as sample image elements instead of individual pixels may help reduce processing requirements for analyzing the sample image 80.

In some embodiments, block 204 may direct the analyzer processor 100 to break the sample image down into subimages (for example, conceptually or virtually) and to apply neural networks to each of the subimages. In some embodiments, block 204 may direct the analyzer processor 100 to, for each of the sample image elements, apply at least one of the one or more functions to a respective subimage included in the sample image and including the sample image element and disregard the rest of the sample image, each of the subimages having a width and height less than a width and height of the sample image. Thus, in some embodiments, block 204 may direct the image analyzer 12 to use subimages as inputs to the one or more functions, such that only information included in a subimage surrounding each pixel square is considered when determining the property specific confidence related scores. In various embodiments, this may facilitate faster and/or more efficient determining of the property specific confidence related scores.

Figure 5:
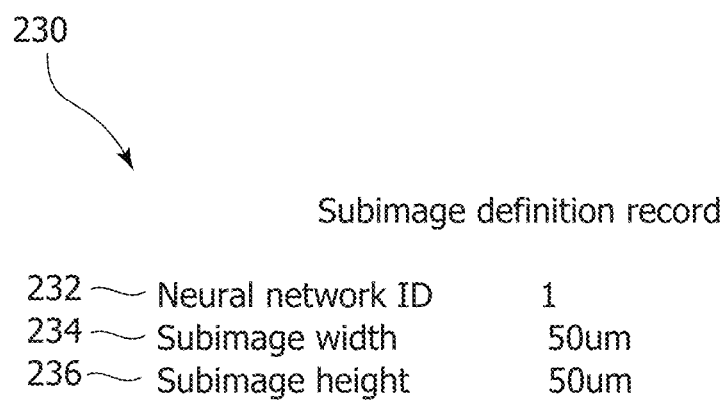
FIG. 5 is a representation of an exemplary subimage definition record that may be used in the system shown in FIG. 1, in accordance with various embodiments.

In some embodiments, the subimages may be considered as providing the entire context required to make a determination regarding a property of the pixel square that they surround. In some embodiments, a size of the subimages may be previously set by a user, in micrometers, for example, as defining a context size or field of view required to evaluate a sample property. In various embodiments, the subimage size may be highly application-specific and may reflect the properties of the feature or sample property to which it pertains. In some embodiments, a subimage definition record 230 as shown in FIG. 5, for example, may be stored in the location 144 of the storage memory 104, the subimage definition record 230 including a neural network identifier field 232 for storing an identifier identifying the epithelial tissue and portion of stroma detecting neural network stored in the location 142, a subimage width field 234 for storing a width in micrometers of the subimage to be used with the associated neural network and a subimage height field 236 for storing an image height in micrometers of the subimage to be used with the associated neural network. In various embodiments, the subimage definition record may include additional or alternative size defining fields, such as diameter, for example.

In some embodiments, the subimages may be processed such that calculations may be shared or reused for processing of image elements or features of adjacent and/or partially overlapping subimages. In various embodiments, the subimages may be processed at least in part in parallel.

In various embodiments, block 204 may direct the analyzer processor 100 to retrieve the subimage definition record 230 from the location 144 of the storage memory 104 shown in FIG. 3 and to read the subimage width and height fields 234 and 236. Block 204 may direct the analyzer processor 100 to, for each pixel square included in the sample image 80, cause a subimage, centered on the pixel square and having a width and height that corresponds to the subimage width and height retrieved, to be processed using the epithelial tissue and portion of stroma detecting neural network defined in the location 142 of the storage memory 104.

In various embodiments, for pixel squares near the border of the sample image 80, a "virtual" extended image may be generated (or assumed) for areas beyond the borders of the sample image, where the virtual (previously undefined) pixels get values according to a formula, such as, for example: assuming the (previously undefined) pixels are all white; or assuming the (previously undefined) pixels are all black; or replicating the edge pixel values for as wide a band as is needed; or reflecting edge pixel values by mirroring the image from the edge; or "wrapping" by using pixels from the other side of the image. In some embodiments, block 204 may direct the analyzer processor 100 to replicate with blurring that gets progressively stronger when going further and further away from the original area within the sample image 80. In various embodiments, this blurring may prevent unwanted replication of possible features that may be visible near the edge in the original image, while reducing the introduction of new features or artifacts, such as strong edges, in the (virtual) extended image.

Figure 6:
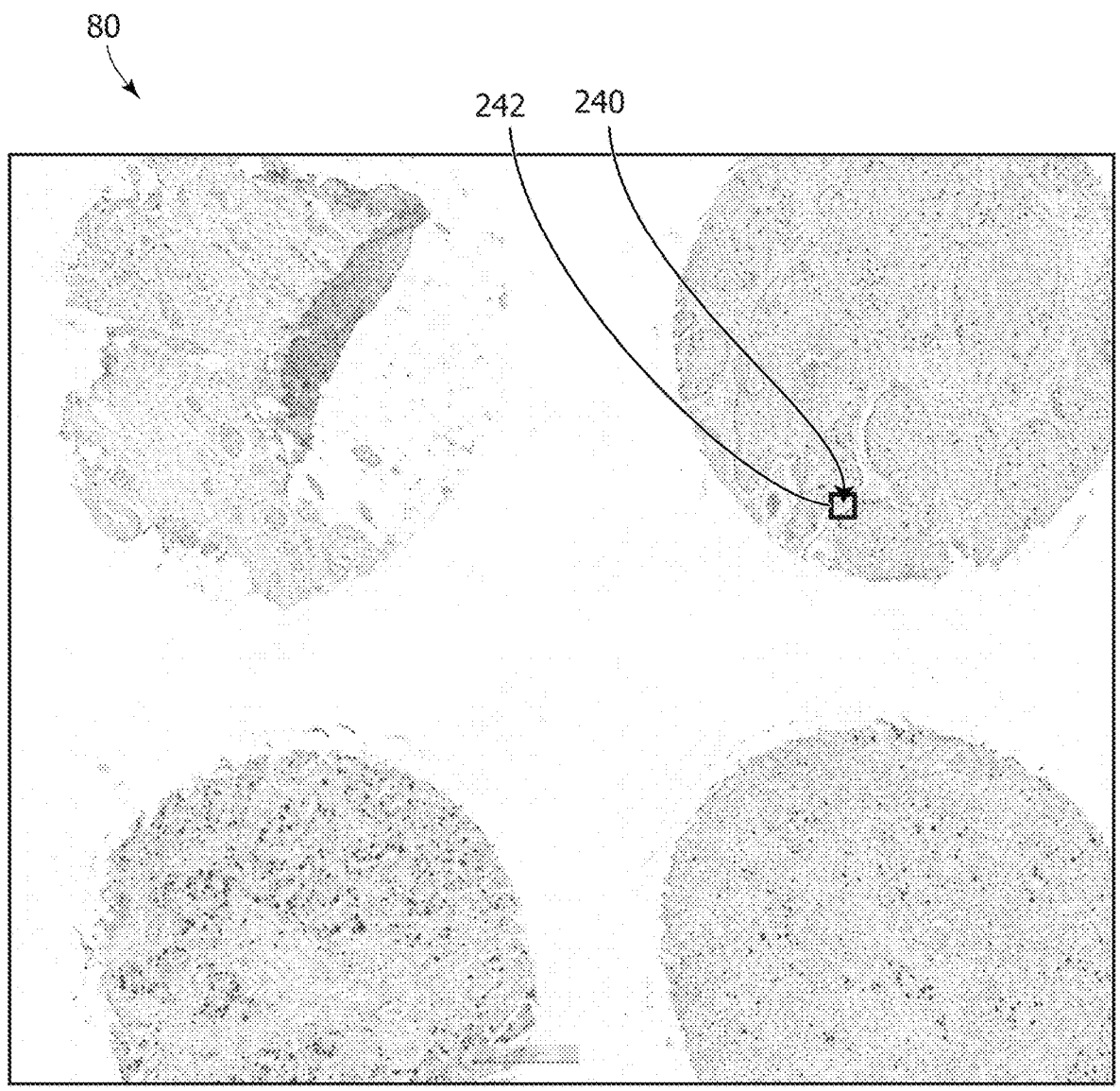
FIG. 6 is a representation of a sample image that may be used in the system shown in FIG. 1, in accordance with various embodiments.

Referring to FIG. 6, the sample image 80 is shown for illustration purposes including a pixel square 240 and an associated subimage denoted by 242, the subimage 242 including the pixel square 240. In various embodiments, block 204 may direct the analyzer processor 100 to determine the property specific confidence related scores for the pixel square 240 based on pixel squares included in the subimage 242. In some embodiments, block 204 may direct the image analyzer 12 to determine property specific confidence related scores for each pixel square included in the sample image 80, generally similarly, based on respective subimages.

In various embodiments, execution of block 204 may result in determining first, second, and third scores associated with each of a plurality of pixel squares of the sample image 80, the first score associated with the property, "represents epithelial tissue" and representing a level of confidence that the associated pixel square represents epithelial tissue, the second score associated with the property, "represents a portion of stroma" and representing a level of confidence that the associated pixel square represents a portion of stroma, and the third score associated with the property "does not represent epithelial tissue or stroma" and representing a level of confidence that the associated pixel square does not represent epithelial tissue or stroma. In various embodiments, block 204 may direct the analyzer processor 100 to store the first, second, and third scores in first, second, and third score records 280, 320, and 360 shown in FIGS. 7, 8, and 9 in the location 146 of the storage memory 104. In some embodiments, for example, block 204 may direct the analyzer processor 100 to generate and store the first score record 280 as shown in FIG. 7 including a property identifier field 282, for storing an identifier for identifying the property associated with the scores included in the score record 280, and pixel square score fields 284, each pixel square score field associated with a pixel square included in the sample image 80 shown in FIG. 2. Block 204 may direct the analyzer processor 100 to generate and store similar second and third score records 320 and 360 as shown in FIGS. 8 and 9 in the location 146 of the storage memory 104.

In some embodiments, for example, the scores determined at block 204 and stored in the first, second, and third score records 280, 320 and 360 shown in FIGS. 7, 8, and 9 may generally vary between about −5 and about +5, with −5 representing a low confidence and +5 representing a high confidence. In various embodiments, there may be no limits for the score values (such as −5 or +5). For example, the score distribution may follow a normal distribution, or similar distribution.

Referring to FIG. 4, block 206 then directs the analyzer processor 100 to sort a set of sample image elements of the plurality of sample image elements based at least in part on the property specific confidence related scores associated with the set of sample image elements. In some embodiments, block 206 may include codes for directing the analyzer processor 100 to sort pixel squares included in the sample image 80 such that pixel squares which are more likely to have been mischaracterized by the one or more functions are sorted ahead of other pixel squares.

Figure 10:
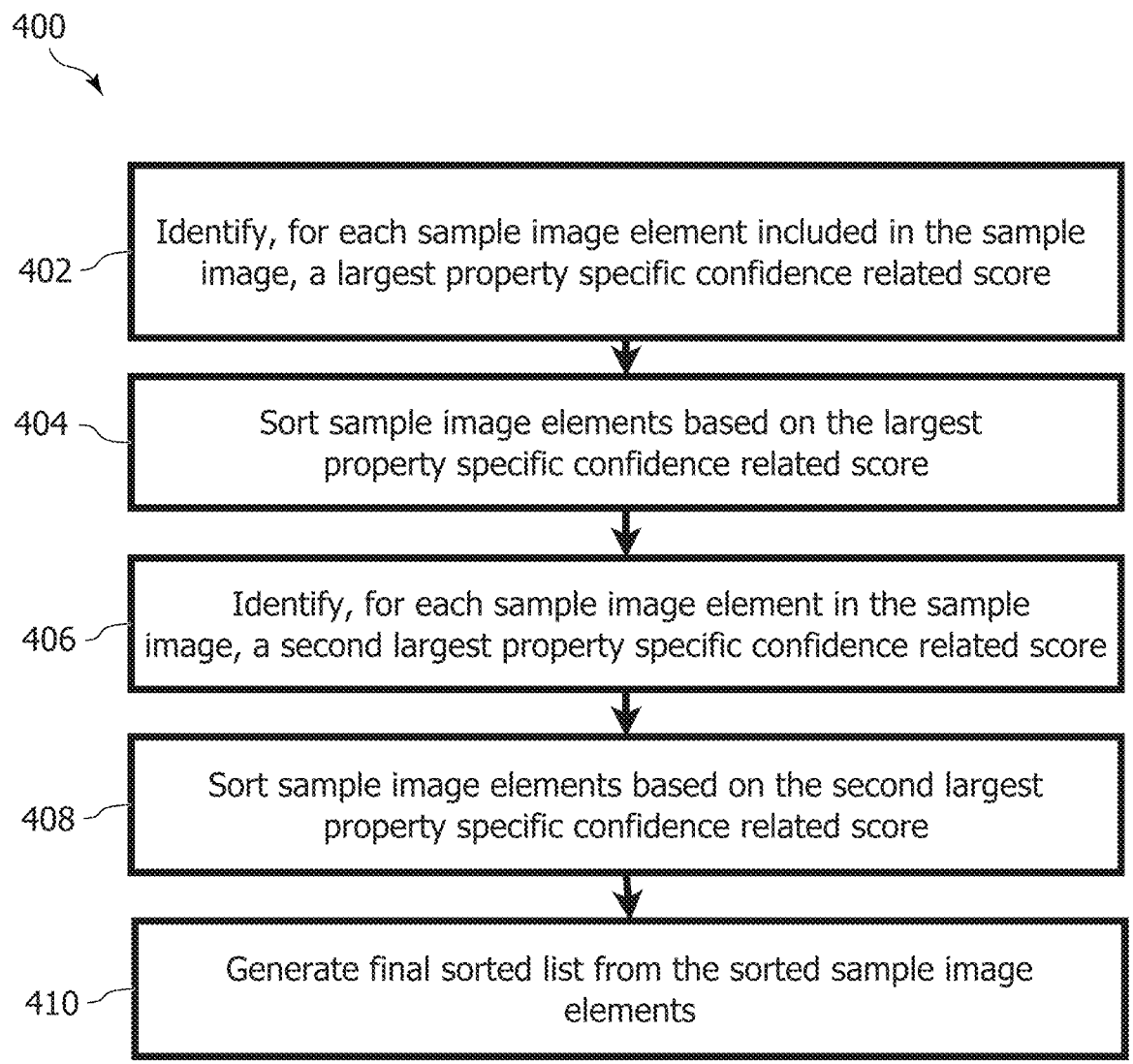
FIG. 10 is a flowchart depicting blocks of code that may be included in the flowchart shown in FIG. 4, in accordance with various embodiments.

Referring now to FIG. 10, there is shown a flowchart 400 depicting blocks of code that may be included in the block 206 of the flowchart 200 in accordance with various embodiments. In various embodiments, the blocks of code of the flowchart 400 may direct the analyzer processor 100 to sort pixel squares into one or more initial lists, the initial lists sorted such that pixel squares which are more likely to have been mischaracterized by the one or more functions are sorted ahead of other pixel squares, and then to generate a final list from the generated one or more initial lists.

The flowchart 400 begins with block 402 which directs the analyzer processor 100 to identify, for each sample image element included in the sample image, a largest property specific confidence related score of the related property specific confidence related scores associated with the sample image element. In various embodiments, block 402 may direct the analyzer processor 100 to, for each pixel square included in the sample image 80, compare the associated pixel square scores stored in the pixel square score fields included in the first, second, and third score records 280, 320, and 360 shown in FIGS. 7, 8, and 9, to identify the largest pixel square score.

Figure 11:
FIG. 11 is a representation of an exemplary largest score record that may be used in the system shown in FIG. 1, in accordance with various embodiments.

Block 402 may direct the analyzer processor 100 to generate a largest score record 420 as shown in FIG. 11, the largest score record 420 including largest pixel square score fields 422 for storing the identified largest of the related scores for each of the pixel squares included in the sample image 80. Block 402 may direct the analyzer processor 100 to store the largest score record 420 in the location 148 of the storage memory 104.

Figure 12:
FIG. 12 is a representation of an exemplary sorted pixel squares record that may be used in the system shown in FIG. 1, in accordance with various embodiments.

Referring to FIG. 10, block 404 then directs the analyzer processor 100 to sort sample image elements based on the largest property specific confidence related scores. In some embodiments, block 404 may direct the analyzer processor 100 to sort the pixel squares associated with the various largest pixel square score fields 422 shown in FIG. 11 based on the values stored in the largest pixel square score fields 422. In some embodiments, block 404 may direct the analyzer processor 100 to generate a first sorted pixel squares record 440 as shown in FIG. 12 including sorted pixel square identifier fields 442 for storing pixel square identifiers which are sorted in ascending order of the largest associated pixel square scores. In various embodiments, the pixel square identifier fields 442 may each store a unique pixel square identifier identifying a pixel square included in the sample image 80 shown in FIG. 2 and the pixel square identifier fields 442 of the first sorted pixel squares record 440 may be sorted in ascending order based on the largest pixel square score fields 422 of the largest score record 420 shown in FIG. 11. In various embodiments, the first sorted pixel squares record 440 may act as a first sorted list of the pixel squares that is sorted based on the largest of the first, second, and third scores. In various embodiments, block 404 may direct the analyzer processor 100 to store the first sorted pixel squares record 440 in the location 150 of the storage memory 104.

In some embodiments, block 404 may direct the analyzer processor 100 to include a subset of the pixel square identifiers in the first sorted pixel squares record 440.

For example, in some embodiments, block 404 may direct the analyzer processor 100 to include a number of pixel square identifiers that a user might be able to review in a single session, such as for example, about 100 pixel square identifiers. In various embodiments, by including only a subset of the pixel square identifiers in the first sorted pixel squares record 440, computation resources and/or time required for processing may be kept low.

As discussed above, in various embodiments, the first sorted pixel squares record 440 shown in FIG. 12 may be ordered in ascending order of the identified largest scores, such that pixel squares associated with the lowest scores appear first in the list. In various embodiments, the pixel squares associated with the lowest scores may be pixel squares associated with scores that do not include any scores representing high confidence for any property and so these may be pixel squares that are most likely to be mischaracterized.

Referring to FIG. 10, in various embodiments, the flowchart 400 includes block 406 which directs the analyzer processor 100 to identify, for each sample image element in the sample image, a second largest property specific confidence related score of the related property specific confidence related scores associated with the sample image element.

For example, in some embodiments, block 406 may direct the analyzer processor 100 to identify for each pixel square included in the sample image 80, which of the associated scores stored in the first, second, and third scores records 280, 320, and 340 is the second largest. In various embodiments, block 406 may include code generally similar to the block 402 but for identifying the second largest score. In various embodiments, block 406 may direct the analyzer processor 100 to generate a second largest score record 480 as shown in FIG. 13. Block 406 may direct the analyzer processor 100 to store the second largest score record 480 in the location 152 of the storage memory 104.

Block 408 then directs the analyzer processor 100 to sort sample image elements based on the second largest property specific confidence related scores. In various embodiments, block 408 may direct the analyzer processor 100 to read the second largest score record 480 shown in FIG. 13 and to sort the pixel squares in descending order of the second largest property specific confidence related scores associated with each of the pixel squares. Block 408 may direct the analyzer processor 100 to generate a second sorted pixel squares record 500 as shown in FIG. 14 and to store the second sorted pixel squares record 500 in the location 150 of the storage memory 104. In various embodiments, the second sorted pixel squares record 500 may act as a second sorted list of the pixel squares that is sorted based on the identified second largest scores.

In some embodiments, the second sorted pixel squares record 500 being sorted in descending order of the identified second largest scores, such that pixel squares associated with the highest identified scores appear first in the list, may result in pixel squares where more than one mutually exclusive property or characterization was found with high confidence being listed first. In various embodiments, these pixel squares may be the most likely to have been mischaracterized since these pixel squares may be pixel squares that are determined to have more than one possible property or characterization.

Referring to FIG. 10, in various embodiments, the flowchart 400 may include block 410 which directs the analyzer processor 100 to generate a final sorted list from the sorted sample image elements. In some embodiments, block 410 may direct the analyzer processor 100 to generate a final sorted list from a plurality of sorted lists previously generated, wherein generating the final sorted list involves adding sample image elements to the final sorted list from each of the plurality of sorted lists. In some embodiments, block 410 may direct the analyzer processor 100 to generate the final sorted list by adding sample image elements alternatingly from each of the plurality of sorted lists, for example.

Figure 15:
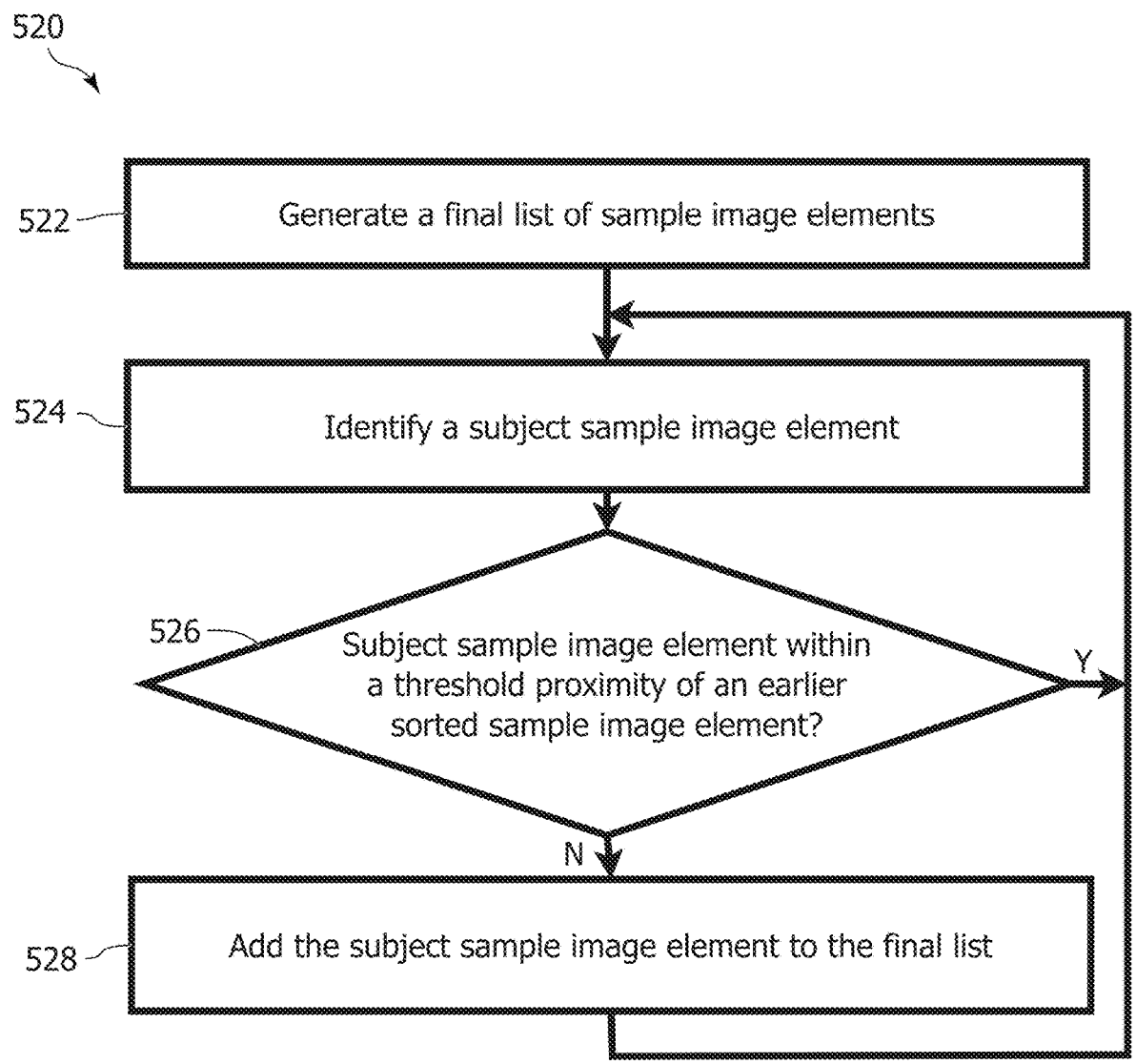
FIG. 15 is a flowchart depicting blocks of code that may be included in the flowchart shown in FIG. 10, in accordance with various embodiments.

Referring to FIG. 15, there is shown a flowchart 520 depicting blocks of code that may be included in block 410 in accordance with various embodiments. The flowchart 520 begins with block 522 which directs the analyzer processor 100 to generate or initialize a final list of sample image elements. In some embodiments, block 522 may direct the analyzer processor 100 to generate a final sorted pixel squares record 540 as shown in FIG. 16 and to store the final sorted pixel squares record 540 in the location 150 of the storage memory 104. In some embodiments, block 522 may direct the analyzer processor 100 to initially add to the final sorted pixel squares record 540, a first pixel square identifier field 542 storing the first listed pixel square identifier from the first sorted pixel squares record 440. Further pixel square identifiers may be added to the final sorted pixel squares record 540 through execution of block 528 of the flowchart 520.

Referring to FIG. 15, block 524 directs the analyzer processor 100 to identify a subject sample image element. In various embodiments, the subject sample image element may be considered for addition to the final sorted pixel squares record 540. In some embodiments, block 524 may direct the analyzer processor 100 to consider in alternating or interleaving fashion, pixel squares identified by the pixel square identifiers from the first and second sorted pixel squares records 440 and 500. For example, in some embodiments, where the last pixel square added to the final sorted pixel squares record 540 was from the first sorted pixel squares record, block 524 may direct the analyzer processor 100 to identify a next pixel square listed from the second sorted pixel squares record 500 as the subject sample image element. In various embodiments, this may result in the final sorted pixel squares record including, in alternating order, equal numbers of pixel identifiers taken from each of the first and second sorted pixel squares records 440 and 500. In various embodiments, more than two sorted pixel squares records may be treated generally as described herein, with pixel squares taken sequentially or alternatingly from each of the lists to generate the final sorted pixels squares record 540.

In some embodiments, block 524 may direct the analyzer processor 100 to consider subject sample image elements unequally from a plurality of lists. For example, in some embodiments, block 524 may direct the analyzer processor 100 to identify subject sample image elements such that two sample image elements are added from one list for every one sample image element added from another list. In various embodiments, other ratios of sample image elements listed in the final list may be used.

In various embodiments, adding the pixel squares from the sorted pixel squares records alternatingly may facilitate generally equal displaying of the pixel squares considered to be most likely mischaracterized according to the different processes used to generate the first and second sorted pixel squares records 440 and 500. In various embodiments, this may facilitate using scores from different lists that are not directly comparable to each other, without over emphasizing results from one list over results from another list. In various embodiments, this may help to avoid a user having to look at a disproportionately large number of samples from one of the lists, compared to samples from any other (non-final) list. In various embodiments, this may facilitate the user reviewing samples originating from different kinds of uncertainties, which may help to improve training.

Block 526 then directs the analyzer processor 100 to determine whether the subject sample image element is within a threshold proximity of an earlier sorted sample image element. For example, in some embodiments, if the sample image element is within a threshold proximity of an earlier sorted sample image element, the sample image element and/or at least a portion of the neighbouring or surrounding sample image elements may be displayed to the user with the earlier sorted sample image element, and so displaying the sample image element later may result in redundancy of review for the user. In various embodiments, first checking whether the subject sample image element is within a threshold proximity of an earlier sorted sample image element before having the subject sample image element displayed to the user may facilitate a reduction in wasted user time and/or resources.

In various embodiments, the threshold proximity may be set based on a size of an artificial intelligence assisted annotation ("AIAA") area within which the subject sample image element will be displayed and reviewed by the user. In some embodiments, block 526 may direct the analyzer processor 100 to review all of the entries already included in the final sorted pixel squares record 540 shown in FIG. 16 and compare coordinates of each of those pixel squares to coordinates of the subject sample image element or pixel square to determine whether the subject sample image element is within a threshold proximity of any of those pixel squares. For example, block 526 may direct the analyzer processor 100 to determine that the subject sample image element is within the threshold proximity when $|x_1-x_2|<A*$width of the AIAA area, and $|y_1-y_2|<B*$height of the AIAA area, where A and B are constants that may have been previously set, and the pixel squares being compared have pixel square coordinates $(x_1, y_1)$ and $(x_2, y_2)$. In some embodiments, the pixel square coordinates may be in μm or other real-world units and may indicate a center of each pixel square, for example.

In some embodiments, A=B=1, for example, such that the subject pixel square will be determined to be within the threshold proximity of an earlier sorted pixel square when at least a portion of an AIAA area around the subject pixel square would be displayed within an AIAA area shown with the earlier sorted pixel square. In various embodiments, setting A=B=1 may result in no redundancy in AIAA areas shown to the user. In some embodiments, other values for A and B may be used.

If at block 526, the analyzer processor 100 determines that the subject sample image is not within a threshold proximity of at least one of the earlier sorted sample image elements, the analyzer processor 100 proceeds to block 528.

Block 528 directs the analyzer processor 100 to add the subject sample image element to the final list. For example, in some embodiments, block 526 may direct the analyzer processor 100 to add the first pixel square identifier listed in the second sorted pixel squares record 500 to the final sorted pixel squares record 540 as a second pixel square identifier field 544 as shown in FIG. 17.

Referring to FIG. 15, after block 528 has been executed or if at block 526 it is determined that the subject sample image element is within a threshold proximity of an earlier sorted sample image element, the analyzer processor 100 is directed to return to block 524. In various embodiments, block 524 may direct the analyzer processor 100 to identify a new subject sample image element. For example, in some embodiments, block 524 may direct the analyzer processor 100 to, after the first pixel square identifier listed in the second sorted pixel squares record 500 was added to the final sorted pixel squares record 540, to next identify the second pixel square identifier listed in the first sorted pixel squares record 440 as the subject sample image element. As discussed above, in various embodiments, block 524 may direct the analyzer processor 100 to identify subject sample image elements in order and alternatingly from each of the sorted pixel squares records.

In various embodiments, blocks 524, 526, and 528 of the flowchart 520 may be repeated for a plurality of the pixel square identifiers included in the first and second sorted pixel squares records 440 and 500 shown in FIGS. 12 and 14, such that the final sorted pixel squares record 540 includes a plurality of pixel square identifier fields as shown in FIG. 18, for example, each including a sorted pixel square identifier identifying a pixel square to be displayed to a user for review. In various embodiments, after blocks 524, 526, and 528 of the flowchart 520 have been repeated for each of the pixel square identifiers included in the first or second sorted pixel squares records 440 and 500 shown in FIGS. 12 and 14, execution of block 410 of the flowchart 400 shown in FIG. 10 may be complete and block 206 of the flowchart 200 shown in FIG. 4 may also be complete.

Referring back to FIG. 4, block 208 directs the analyzer processor 100 to produce signals for causing one or more of the set of sample image elements to be displayed to a user in an order based on the sorting. In some embodiments, block 208 may direct the analyzer processor 100 to use the final sorted pixel squares record 540 stored in the location 150 of the storage memory 104 to determine the order of display for the pixel squares identified therein.

Referring still to FIG. 4, block 210 directs the analyzer processor 100 to, for each of the one or more sample image elements displayed, receive user input. In some embodiments, the user input may include a user-provided indication that a displayed sample image element represents one of the one or more sample properties. In various embodiments, blocks 208 and 210 may be integrated and/or executed concurrently.

Figure 19:
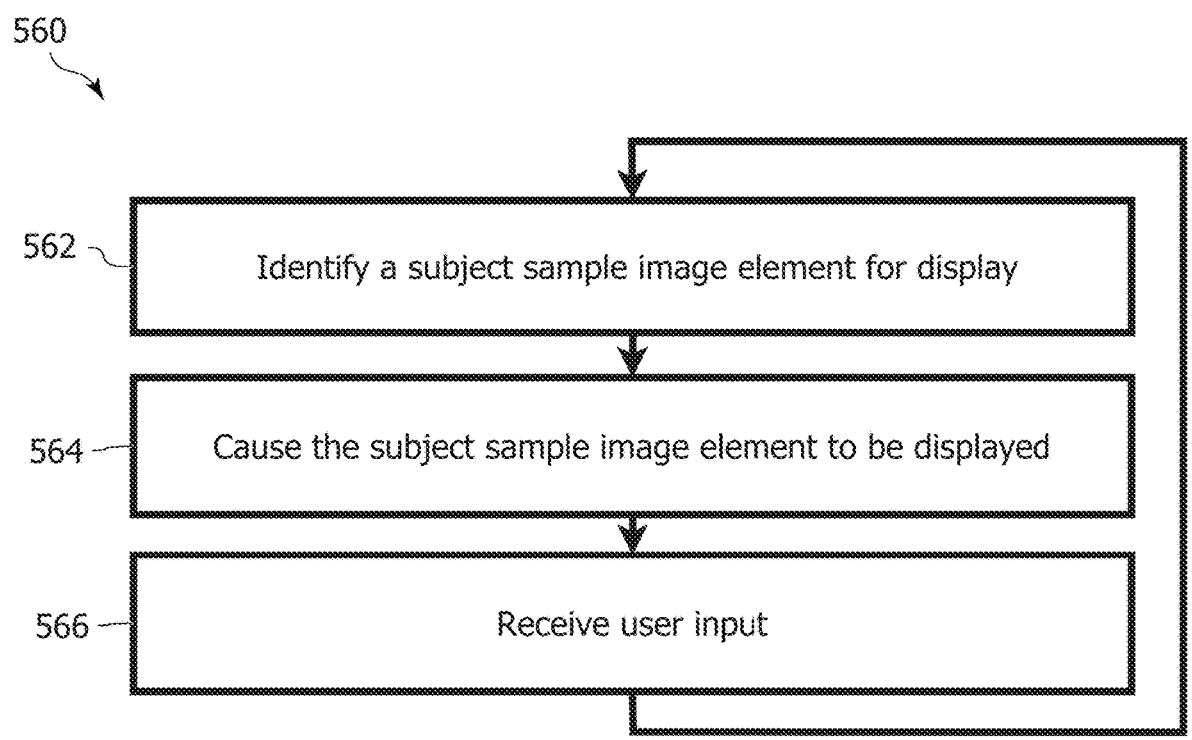
FIG. 19 is a flowchart depicting blocks of code that may be included in the flowchart shown in FIG. 4, in accordance with various embodiments.

Referring to FIG. 19, there is shown a flowchart 560 depicting blocks of code that may be used to implement blocks 208 and 210 of the flowchart 200 shown in FIG. 4 in accordance with various embodiments.

Referring to FIG. 19, the flowchart 560 begins with block 562 which directs the analyzer processor 100 to identify a subject sample image element. In some embodiments, block 562 may direct the analyzer processor 100 to use the final sorted list provided by the final sorted pixel squares record 540 as shown in FIG. 18 and stored in the location 150 of the storage memory 104 shown in FIG. 1 to identify subject sample image elements in the order set out by the final sorted pixel squares record. For example, in a first execution of the block 562, block 562 may direct the analyzer processor 100 to identify the first pixel square identifier included in the final sorted pixel squares record 540 as the subject sample image element.

Block 564 then directs the analyzer processor 100 to cause the subject sample image element to be displayed. In some embodiments, the first pixel square identifier field 542 included in the final sorted pixel squares record 540 shown in FIG. 18 may identify the pixel square 240 shown in FIG. 6 and so block 564 may direct the image analyzer 12 to produce signals for causing the pixel square 240 to be displayed to the user. In some embodiments, block 564 may direct the analyzer processor 100 to display the pixel square 240 by displaying the pixels included in the pixel square 240.

Figure 20:
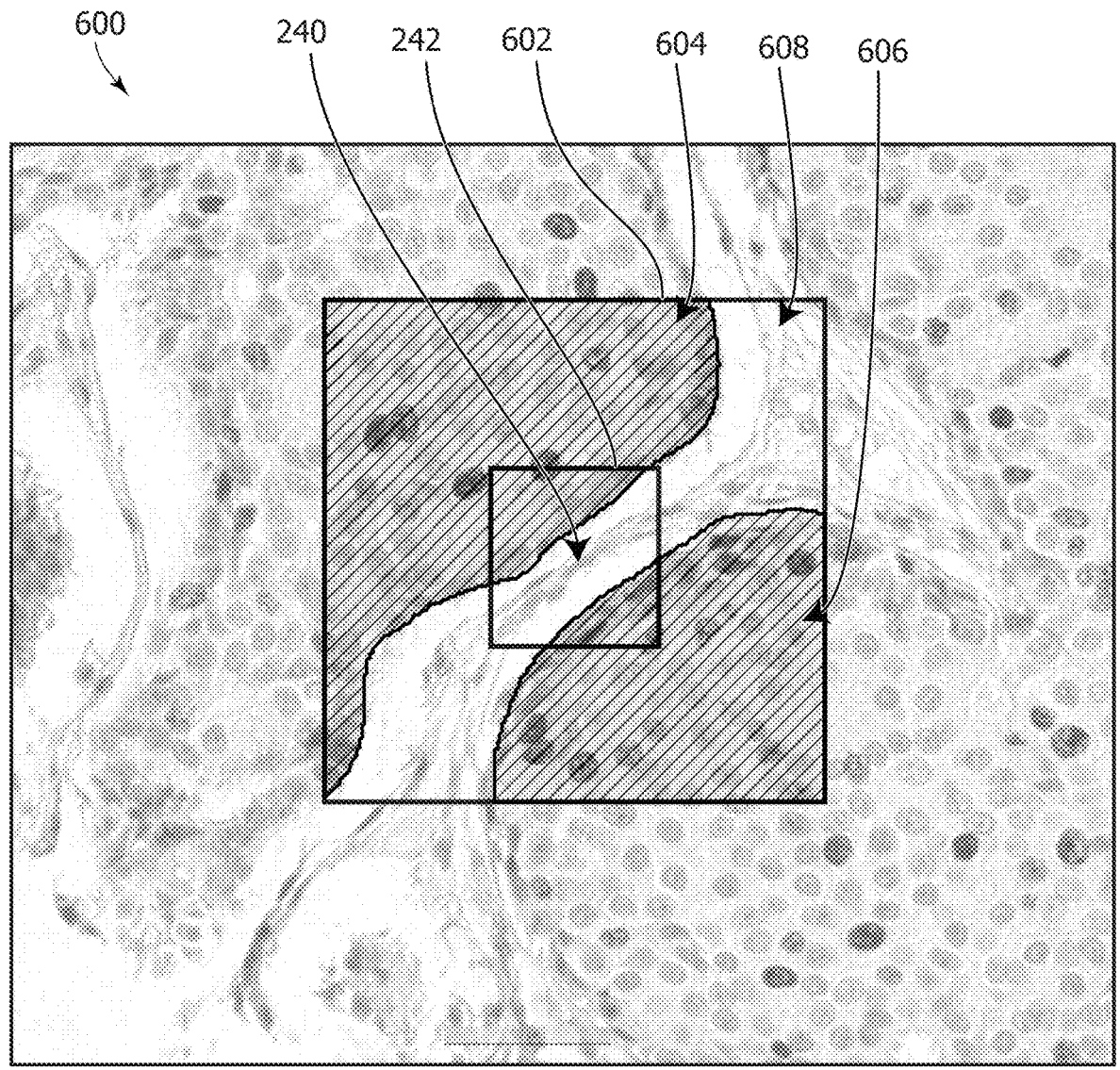
FIG. 20 is a representation of a review image that may be displayed in the system shown in FIG. 1, in accordance with various embodiments.

In some embodiments, block 564 may direct the analyzer processor 100 to produce signals for causing at least one contextual sample image element proximate to the subject sample image element to be displayed to the user with the subject sample image element. For example, in some embodiments, block 564 may direct the analyzer processor 100 to send signals to the display 16 for causing the display 16 to display a review image or window 600 as shown in FIG. 20 to the user, the review image 600 including the pixel square 240, which was identified at block 562 and contextual pixels and/or pixel squares surrounding the pixel square 240. In some embodiments, block 564 may direct the analyzer processor 100 to include in the review image 600 an AIAA area 602 of the sample image 80 within which property specific confidence related scores assigned to each pixel square in the AIAA area 602 may be displayed or represented and may be reviewed and/or corrected by the user.

In some embodiments, block 564 may direct the analyzer processor 100 to cause the AIAA area 602 to include a representation, for each of the pixel squares included in the AIAA area 602, of the property associated with the highest property specific confidence related score for the pixel square. For example, in some embodiments, block 564 may direct the analyzer processor 100 to, for each pixel square, read the first, second, and third score records 280, 320 and 360 shown in FIGS. 7, 8, and 9 to determine which score record lists the highest score for the pixel square.

In various embodiments, the analyzer processor 100 may cause an indicator, such as a polygon and a colour overlay, for example, to represent the property associated with the determined score record. For example, in some embodiments, pixel squares with highest scores included in the first score record 280 may be initially assumed to have the sample property "represents epithelial tissue" and may be represented with pixels having a red overlay, pixel squares with highest scores included in the second score record 320 may be initially assumed to have the sample property "represents a portion of stroma" and may be represented with pixels having a green overlay, and pixel squares with highest scores included in the third score record 360 may be initially assumed to have the sample property "does not represent epithelial tissue or stroma" and may be shown without a colour filter or polygon overlaid.

As can be seen in the example provided by the AIAA area 602 shown in FIG. 20, pixels in pixel squares with higher scores related to "represents epithelial tissue" may be shown with a red overlay at 604 and 606 (shown as diagonal hatching or darker shading or gray overlay in FIG. 20), for example, and pixels in pixel squares with higher scores associated with "does not represent epithelial tissue" may be shown without any overlay at 608, for example. In various embodiments, presenting the user with an indication of what the neural network initially determined the pixel squares to represent may facilitate faster and easier review, amendment, and/or confirmation of properties of the pixels and/or pixel squares by the user.

In some embodiments, being configured to display more than one type of tissue (e.g., epithelial tissue and stroma) may allow the user to confirm and/or draw for multiple sample properties or classes in the same review image or viewport.

In some embodiments, the size of the AIAA area 602 may be chosen based on the size of the subimage used. For example, in various embodiments, block 564 may direct the analyzer processor 100 to cause the AIAA area 602 to have a width about 1 to 10 times the width of the subimage 242 and a height about 1 to 10 times the height of the subimage 242. For example, in some embodiments, block 564 may direct the analyzer processor 100 to cause the AIAA area 602 to have a width and a height 3 times the width and height of the subimage 242. Alternatively, in some embodiments, the width and height of the AIAA area 602 may be unequal.

In various embodiments, block 564 may direct the analyzer processor 100 to read the subimage definition record 230 shown in FIG. 5 from the location 144 of the storage memory 104 to determine a width and height to be used for the AIAA area 602. For example, in some embodiments, block 564 may direct the analyzer processor 100 to determine the width and height to be used for the AIAA area 602 to be about 1-10 times the width and 1-10 times the height as set out in the subimage width and subimage height fields 234 and 236 of the subimage definition record 230 shown in FIG. 5. For example, in some embodiments, the width and height to be used for the AIAA area 602 may be about 3 times the width and about 3 times the height as set out in the subimage width and subimage height fields 234 and 236 of the subimage definition record 230 shown in FIG. 5. In various embodiments, block 564 may direct the analyzer processor 100 to convert the width and height from μm to pixels or pixel squares, based on information stored with the sample image 80 in the location 142 of the storage memory 104, for example.

In various embodiments, basing the size of the AIAA area on the size of the subimage may facilitate the user being able to easily judge the sample properties within the AIAA area being shown. In some embodiments, an area too small or too large may prevent the user from being able to identify the sample properties correctly, and thus may slow down the review process and/or cause errors in judgement. In various embodiments, basing the size of the AIAA area on the size of the subimage instead of, for example, requesting user input defining a size of the AIAA area, may help to reduce the amount of user input required to operate the image analyzer 12.

In some embodiments, block 564 may direct the analyzer processor 100 to cause the review image 600 shown in FIG. 19 to include image context around the AIAA area 602. In some embodiments, the image context surrounding the AIAA area 602 and the AIAA area 602 may together have a width and height about 3-15 times the width and height of the subimage. For example, in some embodiments, the image context surrounding the AIAA area 602 and the AIAA area 602 may together have a width about 3-9 times the width of the subimage 242 and a height about 3-9 times the height of the subimage 242. In various embodiments, providing the image context around the AIAA area 602 may allow users to be able to classify or determine properties for all of the pixels or pixel squares included in the AIAA area 602, even the ones on the edges. In various embodiments, if the AIAA area 602 was not displayed with additional context surroundings, it may be difficult or impossible for a user to determine properties for all of the pixels and/or pixel squares included in the AIAA area 602. In various embodiments, basing the size of the image context around the AIAA area 602 on a size of the subimage may provide advantages generally similar to those described above regarding basing the size of the AIAA area on the subimage size. In some embodiments, block 564 may include code for directing the analyzer processor 100 to allow a user to zoom in and out and thereby adjust the image context shown, such that the default image context width and height is something that is not fixed.

In various embodiments, after block 564 has been executed for a subject sample image element, the analyzer processor 100 may proceed to block 566, which may implement aspects of the block 210 of the flowchart 200 shown in FIG. 4. In various embodiments, block 566 may direct the analyzer processor 100 to receive user input.

In some embodiments, a user may interact with the display 16 when the review image 600 shown in FIG. 20 is displayed. In some embodiments, the user may interact with the display 16 using a pointing device, for example, to reshape what is shown in red and what is not shown in red, to denote which pixels the user believes should be characterized as "represents epithelial tissue" and which pixels the user believes should be characterized as "does not represent epithelial tissue or a portion of stroma". Alternatively, the user may determine that what is shown is correct and simply select submit without reshaping what is shown. Accordingly, in various embodiments, the user may provide user input including a user-provided indication, for each pixel, of which one of the one or more sample properties, the pixel represents. In various embodiments, this may act as a user-provided indication that the pixel represents a sample property. In some embodiments, the user-provided indications of which pixels within a particular pixel square represent which sample properties may act as a user-provided indication that the pixel square represents the sample property represented by the most pixels within the pixel square.

In various embodiments, once the user is satisfied, the user may select submit and all of the property information depicted in the AIAA area 602 may be considered to be confirmed by the user. Accordingly, when the user selects submit, block 566 may direct the analyzer processor 100 to receive a user provided or confirmed property association for each of the pixels included in the AIAA area 602. In various embodiments, this user-provided property association for the pixels may be interpreted as and/or later converted into a user-provided property association for each of a plurality of pixel squares included in the AIAA area 602 (for example, by considering the most prevalent pixel associated property for pixels within a pixel square to be confirmed by the user as associated with the pixel square). In various embodiments, because the AIAA area 602 includes both the subject pixel square 240 and contextual pixels or pixel squares proximate to the subject pixel square 240, the property associations for the pixels in the AIAA area 602 may include user-provided indications that the contextual pixels or pixel squares and the subject pixel square 240 represent various properties.

In various embodiments, because the subject pixel square 240 may have been difficult for the epithelial tissue and portion of stroma detecting neural network to characterize, the information provided by the user regarding pixels included in the subject pixel square may be particularly helpful in training the epithelial tissue and portion of stroma detecting neural network. In various embodiments, because the AIAA area also includes contextual pixels or pixel squares which may not have been difficult for the epithelial tissue and portion of stroma detecting neural network to characterize, this may help the user to avoid discouragement that may arise from reviewing pixels and/or pixel squares that are difficult to analyze and/or may provide additional confirmed information that can help with neural network training.

Block 566 may direct the analyzer processor 100 to store in storage memory user confirmed property associations for each pixel included in the AIAA area 602. For example, block 566 may direct the image analyzer to save an integer result for each of the pixels included in the AIAA area 602 as an index of the corresponding property or class for each pixel, based on the user input for the pixels, for example, such that during training at block 212 of the flowchart 200 shown in FIG. 4, pixel squares may be defined and associated with corresponding properties, and gradients may be computed depending on the indices. In various embodiments, for example, an index may be as follows: 0=no epithelium and no stroma; 1=epithelium; 2=stroma.

In various embodiments, block 210 may direct the analyzer processor 100 to generate a user confirmed pixel record 640 as shown in FIG. 21 based on the input provided by the user at block 210. Block 210 may direct the analyzer processor 100 to store the user confirmed pixel record 640 in the location 154 of the storage memory 104 shown in FIG. 3. The user confirmed pixel record 640 may include a plurality of pixel identifier fields for storing pixel identifiers uniquely identifying pixels included in the AIAA area 602 and each of the pixel identifier fields may be associated with a property field for storing a property or class identifier representing the property or class that the user confirmed corresponds to the associated pixel. For example, referring to FIG. 21, the user confirmed pixel record 640 may include a first pixel identifier field 642 and an associated property field 644 storing a value of 1 indicating that the pixel identified by the pixel identifier stored in the first pixel identifier field 642 represents epithelial tissue.

After block 566 has been executed and the user confirmed pixel record 640 has been generated and stored for the AIAA area 602 associated with the sample image element identified as the subject sample image element, the analyzer processor 100 may return to block 562 of the flowchart 560 shown in FIG. 19 and a new subject sample image element may be identified and displayed. In various embodiments, block 562 may direct the analyzer processor 100 to identify the next pixel square identified in the final sorted pixel squares record 540 shown in FIG. 18 as the subject sample image element. Block 564 may then direct the analyzer processor 100 to cause the identified pixel square to be displayed to the user and block 566 may direct the analyzer processor 100 to receive user input for the AIAA area displayed therewith.

Accordingly, blocks 562, 564 and 566 of the flowchart 560 may be executed for a plurality of pixel squares included in the final sorted pixel squares record 540 shown in FIG. 18, such that a plurality of user confirmed pixel records having a format generally similar to the user confirmed pixel record 640 shown in FIG. 21 are stored in the location 154 of the storage memory 104. In various embodiments, there may be more pixel squares included in the final sorted pixel squares record 540 shown in FIG. 18 than the user wishes to review. For example, the user may wish to take a break or be done providing input for the day and/or indefinitely.

Accordingly, in various embodiments, the user may end the execution of the flowchart 560 shown in FIG. 19. For example, in some embodiments, the user may interact with the display 16 to cause a user input end message to be sent to the analyzer processor 100 and the flowchart 560 may include a block of code directing the analyzer processor 100 to receive the user input end message, indicating that the user wishes to stop providing user input and to, based on the received user input end message, proceed to block 212 of the flowchart 200 shown in FIG. 4, for example.

In various embodiments, allowing the user to end the user input when they wish may facilitate use of the image analyzer 12 by users or experts who may not be able to spend a lot of time providing input and/or may not be able to predict how long they will be able to provide their input. In various embodiments, because the sample image elements that the user views and considers are provided in an order such that those likely to be mischaracterized are shown early, even if the user ends their review early, the input provided may be the most helpful for causing the one or more functions to be updated.

In various embodiments, when the flowchart 560 shown in FIG. 19 ends or if training is otherwise triggered, the analyzer processor 100 may proceed to block 212 of the flowchart 200 shown in FIG. 4. In various embodiments, block 212 may direct the analyzer processor 100 to cause the user input to be used to update the one or more functions. In various embodiments, block 212 may direct the analyzer processor 100 to define a plurality of user confirmed pixel squares from the pixels identified in the user confirmed pixel records stored in the location 154 of the storage memory 104 and to associate each of the pixel squares with a sample property.

In some embodiments, block 212 may direct the analyzer processor 100 to define the locations of the user confirmed pixel squares differently from the pixel squares that were used for determining the property specific confidence related scores at block 204 of the flowchart 200. In some embodiments, block 212 may direct the analyzer processor 100 to define the user confirmed pixel squares using a random distribution within the areas including the identified pixels from the user confirmed pixel records. In some embodiments, the pixel squares may be defined without using a grid distribution. In some embodiments, block 212 may direct the analyzer processor 100 to define the user confirmed pixel squares as overlapping. In some embodiments, this may result in more training data provided by the user input than would be provided using a grid of pixel squares within each AIAA area.

Figure 22:
FIG. 22 is a representation of an exemplary user confirmed pixel square record that may be used in the system shown in FIG. 1, in accordance with various embodiments.

In some embodiments, block 212 may direct the analyzer processor 100 to associate each user confirmed pixel square with the most prevalent sample property associated with the pixels included in the pixel square. In some embodiments, block 212 may direct the analyzer processor 100 to generate a user confirmed pixel square record 660 as shown in FIG. 22 based on the contents of the user confirmed pixel record 640 stored in the location 154 of the storage memory 104, the user confirmed pixel square record 660 identifying a plurality of pixel squares from the AIAA area 602 and associated properties for each pixel square.

Block 212 may direct the analyzer processor 100 to store the user confirmed pixel square record 660 in the location 154 of the storage memory 104 shown in FIG. 3. The user confirmed pixel square record 660 may include sets of pixel square x-coordinate and y-coordinate fields uniquely locating the pixel squares within the sample image 80. The x and y coordinate fields may act as pixel square identifiers and each set of coordinates may be associated with a property field for storing a property or class identifier representing the property or class associated with the pixel square (determined based on the pixels included in the pixel square). In some embodiments, all of the pixel squares may be known to be the same size (e.g., 10 pixels by 10 pixels). In some embodiments, the user confirmed pixel square record 660 may include one or more pixel square definition fields for storing additional properties for the user confirmed pixel squares, such as size.

In some embodiments, block 212 may direct the analyzer processor 100 to generate a respective user confirmed pixel square record for each user confirmed pixel record stored in the location 154 of the storage memory 104. In various embodiments, the user confirmed pixel square records may be stored in the location 154 of the storage memory 104. In various embodiments, the user confirmed pixel square records may be included in updated training data.

In various embodiments, block 212 may direct the image analyzer 12 to train the neural network functions based on updated training data derived from user input received at block 210. For example, in various embodiments, a plurality of user confirmed pixel square records may be stored in the location 154 of the storage memory 104 and block 212 may direct the analyzer processor 100 to update the neural network definition information stored in the location 140 of the storage memory 104 based at least in part on the user confirmed pixel square records and the contents of the sample image 80 from which the pixel squares are taken.

In some embodiments, the neural network may be trained from scratch, generally in the same way as it was initially trained but now including the new samples as well. Alternatively, in some embodiments, the old network may be used as a starting point (instead of random-initialized, or other default-initialized network), with a learning rate parameter chosen suitably.

In some embodiments, the user will have been shown two or more sample image elements and training will not occur after every single sample image element is shown to the user. In various embodiments, this may avoid processing resources being used between every displayed image, which may reduce costs and/or time required, for example. In some embodiments, this may avoid the user needing to wait for the neural network to be updated between every displayed image, which may allow the user to provide user input more quickly and more easily. In various embodiments, this may be particularly desirable since the user may be a highly skilled individual for whom time is quite valuable. In some embodiments, a new function or neural network may be trained in background, as the user continues to provide user input based on AIAA areas as suggested by a current/previous function or neural network. In such embodiments, the user may not need to wait for the training to finish before providing further input.

Objects as Sample Image Elements

In various embodiments described above, the sample image elements considered and processed during execution of the flowchart 200 shown in FIG. 4 may include pixel squares and/or pixels. However, in various embodiments, blocks of code included in the flowchart 200 shown in FIG. 4 may be configured to use or analyze additional or alternative types of sample image elements. For example, in some embodiments, groups of pixels or groups of pixel squares, which may be identifiable as objects, may act as sample image elements included in the sample image 80 and processed during execution of the flowchart 200 shown in FIG. 4.

In such embodiments, block 202 may be executed as described above and a representation of sample image 80 may be stored in the location 140 of the storage memory 104 shown in FIG. 3.

Block 204 may include code for directing the analyzer processor 100 to cause one or more object identifying neural network functions to be applied to the sample image 80. For example, in some embodiments, the object identifying neural network functions may be configured to identify various objects, which may include a group of one or more pixels, included in the sample image 80 as representing one or more of the following objects or properties of an epithelial cell: nuclei, mitoses, or cells expressing a specific protein, such as, for example Ki-67. In some embodiments, the object identifying neural networks may incorporate results from the epithelial tissue and portion of stroma detecting neural network. For example, in some embodiments, only pixels or regions that are included in pixel squares identified as epithelial tissue by the epithelial tissue and portion of stroma detecting neural network may be considered for identification of nuclei, mitoses, or cells expressing Ki-67 as objects. In various embodiments, the object identifying networks may be computationally more demanding than the epithelial tissue and portion of stroma detecting neural network and so this may result in significant savings in terms of time and/or money.

In some embodiments, improving and/or training the object identifying neural networks to identify nuclei, mitoses and/or cells expressing Ki-67 may be useful in pathology. For example, in some embodiments, facilitating machine identification of cells expressing Ki-67 may enable metrics, such as a count of the number of cells expressing Ki-67, to be derived from the identification which may be useful in pathology since Ki-67 is a prognostic biomarker that appears on proliferating cells and is thus an indicator of tumor proliferation. In some embodiments, facilitating machine identification of mitoses may enable determination of metrics such as a count of the number of cells undergoing mitosis, which may indicate expansion of a tumor, for example. In some embodiments, facilitating machine identification of nuclei may enable metrics, such as, nuclear size and size distribution to be derived from the identification which may be helpful in diagnosing the aggressiveness of a cancer, such as, breast cancer, for example. In various embodiments, alternative or additional metrics may be determined/calculated which may be useful in research and/or diagnosis.

In some embodiments, data defining a nucleus object identifying neural network function may be stored in the location 142 of the storage memory 104 shown in FIG. 3. The nucleus object identifying neural network function may have been previously trained and may be configured to identify objects included in the sample image 80 as nuclei. In some embodiments, block 204 may direct the analyzer processor 100 to apply the nucleus object identifying neural network function to the sample image 80 to identify objects within the sample image 80 and determine respective scores to be associated with each object, the scores representing a level of confidence that the identified object represents a nucleus.

In various embodiments, block 204 may direct the analyzer processor 100 to generate a first object score record 680 as shown in FIG. 23 and to store the first object score record 680 in the location 146 of the storage memory 104 shown in FIG. 3. In various embodiments, the first object score record 680 may include a property identifier field 682 for storing an identifier for identifying the property associated with the scores included in the first object score record 680. In various embodiments, the value stored in the property identifier field being set to 3 may indicate that the scores included in the first object score record 680 represent a confidence level that objects associated with the scores represent a nucleus. Referring still to FIG. 23, the first object score record 680 also includes x and y coordinate fields 684 and 686 for storing x and y pixel coordinates of a first object identified at block 204 and an associated score field 688 for storing a score representing a confidence level that the first object represents a nucleus. In some embodiments, the scores may generally range from about −10 to about 10, for example.

In various embodiments, after execution of the block 204, the first object score record 680 may include a plurality of x and y coordinate fields, each associated with an object, and associated score fields. In some embodiments, the values stored in the x and y coordinate fields may together act as an object identifier for uniquely identifying an object.

In various embodiments, block 204 may direct the analyzer processor 100 to similarly apply a mitotic object identifying neural network function and a cells expressing Ki-67 object identifying neural network function to the sample image 80 to identify objects and associated scores representing levels of confidence that the objects represent a mitotic cell and a cell expressing Ki-67 respectively. Accordingly, in various embodiments, after block 204 has been executed a second object score record for storing scores indicating whether identified objects are a mitotic cell and a third object score record for storing scores indicating whether identified objects are cells expressing Ki-67 may be stored in the location 146 of the storage memory 104. In various embodiments, the second and third object score records may have a format generally similar to the first object score record 680 shown in FIG. 23. In various embodiments, the second and third object score records may include property identifier fields storing values of 4 and 5 respectively, for example.

Referring back to FIG. 4, in some embodiments, block 206 may direct the analyzer processor 100 to sort objects identified in the stored object score records based on the associated scores stored in the score fields such that objects most likely to have been mischaracterized are listed first.

In some embodiments, block 206 may direct the image analyzer 12 to sort a set of objects identified by the first object score record 680 by determining, for each of the set of objects, a difference between the property specific confidence related score associated with the object and a property specific confidence related threshold and sorting the set of sample image elements based at least in part on the determined differences. For example, in some embodiments, the scores for each identified object in the first object score record 680 may be compared to a nucleus threshold score to determine whether the object represents a nucleus. In some embodiments, the nucleus threshold score may be 0, for example, such that positive or non-negative scores may be interpreted as representing a nucleus and negative scores may be interpreted as not representing a nucleus.

In some embodiments, the threshold score may have been previously set based on previous results, trying to find a threshold that leads to a desired distribution between false positives and false negatives. For example, a desired distribution might be that the number of false positives is as close as possible to the number of false negatives. In some embodiments, the threshold score may be set by the user manually.

Figure 24:
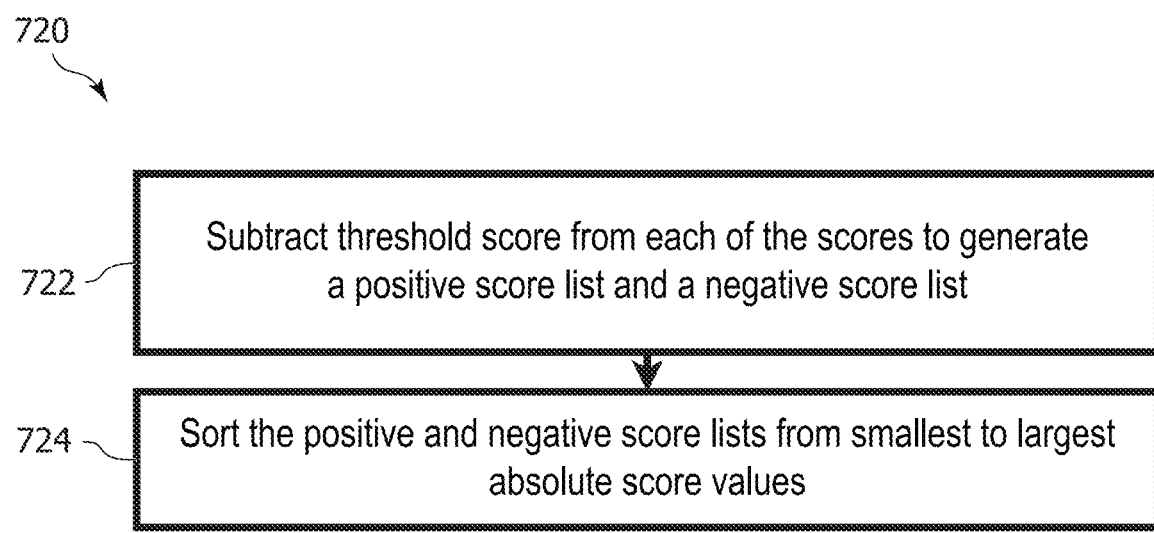
FIG. 24 is a flowchart depicting blocks of code that may be included in the flowchart shown in FIG. 4, in accordance with various embodiments.

Referring to FIG. 24, there is shown a flowchart 720 depicting blocks of code that may be included in the block 206 in accordance with various embodiments. The flowchart 720 begins with block 722 which directs the analyzer processor 100 to subtract a threshold score from each of the scores to generate a positive score list and a negative score list. In some embodiments, block 722 may direct the analyzer processor 100 to subtract the nucleus threshold score from each of the scores included in the first object score record 680 and to generate a positive score record including the positive scores and a negative score record including the negative scores. In various embodiments, block 722 may direct the analyzer processor 100 to store the positive and negative score records in the location 156 of the storage memory 104 shown in FIG. 3.

Referring to FIG. 24, block 724 then directs the analyzer processor 100 to sort the listed objects in the positive and negative score lists from smallest to largest absolute score values, such that the objects associated with scores closest to the threshold score are listed first in both lists. In various embodiments, block 724 may direct the analyzer processor 100 to sort or reorder the object coordinates and associated scores included in the positive and negative score records stored in the location 156 of the storage memory 104 such that the object coordinates and associated scores having scores closest to the threshold score are listed first in both a sorted positive score record 760 as shown in FIG. 25 and a sorted negative score record 780 as shown in FIG. 26. In some embodiments, block 724 may direct the analyzer processor 100 to store the sorted positive and negative score records 760 and 780 in the location 150 of the storage memory 104 shown in FIG. 3. In various embodiments, by generating two lists, one positive and one negative, objects may be displayed from both lists rather evenly, instead of showing a disproportionate number of positive or negative scoring objects in the first shown objects, for example, which may help to improve training.

In some embodiments, block 206 may direct the analyzer processor 100 to execute blocks generally similar to blocks 722 and 724 of the flowchart 720 shown in FIG. 24 to generate and store sorted positive and negative score records in the location 150 of the storage memory 104 for each of the second and third object score records. In various embodiments, different threshold scores may be used for the second and/or third object score records.

Figure 27:
FIG. 27 is a representation of an exemplary final sorted objects record that may be used in the system shown in FIG. 1, in accordance with various embodiments.

In some embodiments, block 206 may direct the analyzer processor 100 to treat the positive and negative score records generally similarly to as described above regarding the sorted pixel squares records, with the object x and y coordinates acting as object identifiers, for example. In some embodiments, the flowchart 520 shown in FIG. 15 may be configured to consider objects as sample image elements and a final list may be generated that includes object x and y coordinate fields storing coordinates identifying objects that have been considered from each of the positive and negative score records. For example, in some embodiments, block 206 may direct the analyzer processor 100 to generate the final sorted objects record 800 as shown in FIG. 27 and to store the final sorted objects record 800 in the location 150 of the storage memory 104.

In some embodiments, the size and shape of each identifiable object or group of pixels may have been previously set by a user and incorporated into the application of object identifying neural network functions at block 204. For example, in some embodiments, each object may include a group of pixels representing a generally circular area having a particular diameter. For example, each nucleus object may have a diameter of about 6 μm. In some embodiments, a representation of the diameter may be stored in association with the neural network definition information stored at location 142 of the storage memory 104 shown in FIG. 3.

In some embodiments, an AIAA area width and height to be used for an object may be based on the size of the object. For example, in some embodiments, the AIAA area width and height may be about 1-10 times the diameter of the object. For example, in some embodiments, the AIAA area width and height may be about 5 times the diameter of the object. In various embodiments, the AIAA area width and height being about 5 times the diameter of the object may facilitate the user being able to see enough context around the object for it to be identifiable while providing a small enough AIAA area for the user to be able to provide accurate analysis and review for the shown sample area. In various embodiments, the AIAA area widths and heights for the objects being considered may be used when block 206 is executed and it is determined whether a first object is within a threshold proximity of an earlier sorted second object.

For example, in some embodiments, block 206 may direct the analyzer processor 100 to determine that the object is within the threshold proximity of the earlier sorted object when $|x_1-x_2|<(C*\text{width of the first object AIAA area}+D*\text{width of the second object AIAA area})$, and $|y_1-y_2|<(E*\text{height of the first object AIAA area}+F*\text{height of the second object AIAA area})$, where C, D, E, and F are constants that may have been previously set, and the objects being compared have pixel coordinates $(x_1, y_1)$ and $(x_2, y_2)$. In some embodiments, $C=D=E=F=0.5$, for example, such that the subject object will be determined to be within the threshold proximity of an earlier sorted object when at least a portion of an AIAA area around the subject object would be displayed within an AIAA area shown with the earlier sorted object. In various embodiments, setting $C=D=E=F=0.5$ may result in no redundancy in AIAA areas shown to the user. In some embodiments, other values for C, D, E, and F may be used.

Referring to FIG. 4, blocks 208 and 210 may direct the analyzer processor 100 to perform generally similar functions for objects as described above having regard to displaying and receiving user input for pixel squares. For example, in some embodiments, the blocks of code included in the flowchart 560 shown in FIG. 19 may be configured to use objects as the sample image elements. In some embodiments, block 564 may direct the analyzer processor 100 to produce signals for causing an AIAA area 820 including an object 822 shown in FIG. 28 to be displayed to the user. In some embodiments, block 564 may direct the analyzer processor 100 to send signals to the display 16 for causing the display 16 to include context in a review image 824 including the AIAA area 820. In various embodiments, each of the review image 824 and AIAA area 820 included in the review image may have respective widths and heights chosen based on the size of the object to be displayed.

In some embodiments, for example, block 564 may direct the analyzer processor 100 to cause the AIAA area 820 to have a width and a height each about 1 to 10 times the diameter of the object 822. In some embodiments, the width and height of the AIAA area 820 may be about 5 times the diameter of the object 822.

In some embodiments, block 564 may direct the analyzer processor 100 to cause the review image 824 to include image context around the AIAA area 820. In some embodiments, the image context surrounding the AIAA area 820 and the AIAA area 820 included in the review image 824 may together have a width and height about 10-20 times the diameter of the object 822, for example. In some embodiments, the width and height of the review image 824 may be about 15 times the maximum diameter of the object 822.

Figure 28:
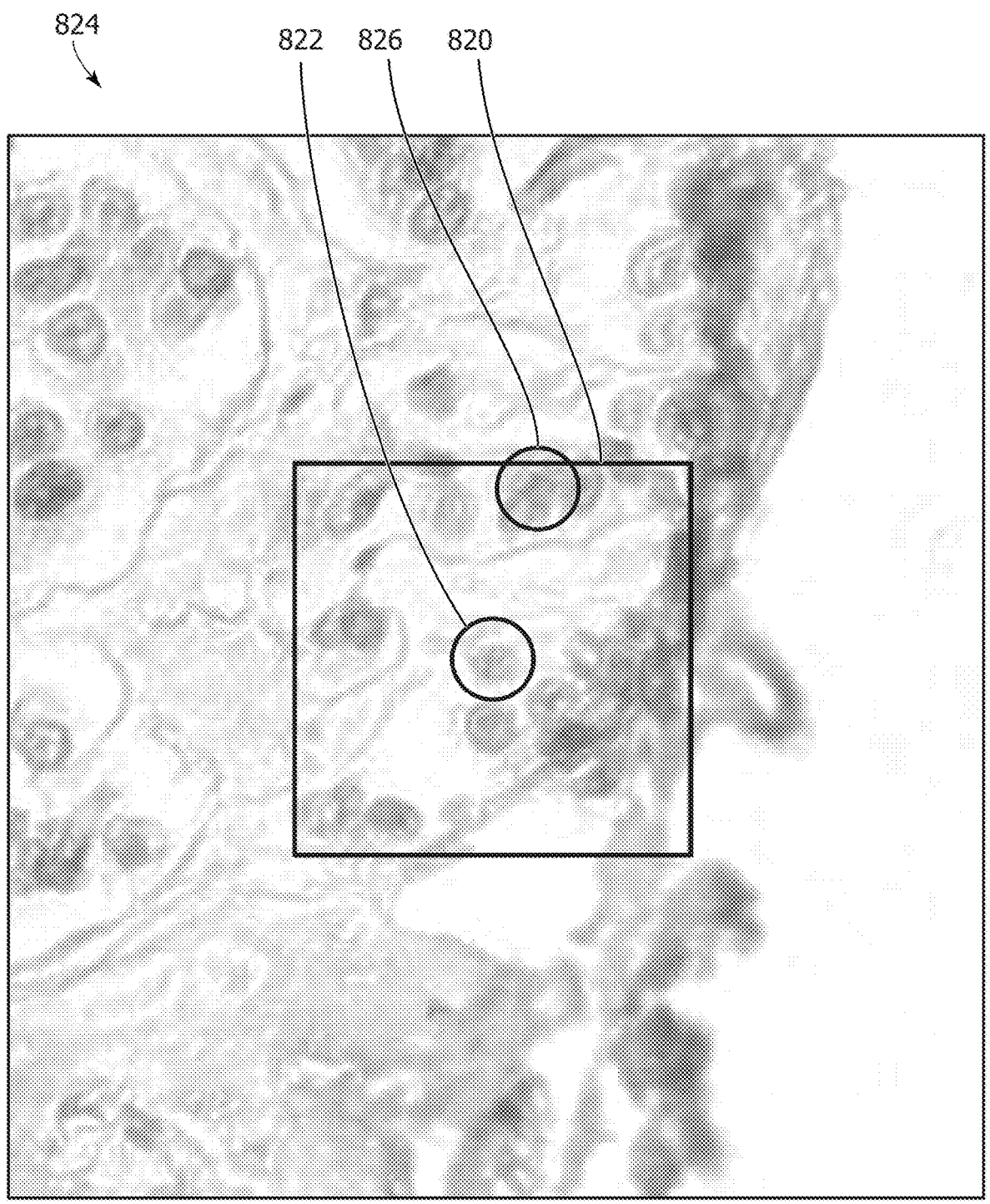
FIG. 28 is a representation of a review image that may be displayed in the system shown in FIG. 1, in accordance with various embodiments.

In various embodiments, block 564 may direct the analyzer processor 100 to read the object score records (including the first object score record 680 shown in FIG. 23, for example) from the location 146 of the storage memory 104 shown in FIG. 3 to identify objects having x and y coordinates within the AIAA area 820. Block 564 may direct the analyzer processor 100 to cause identifiers for the identified objects to be displayed by the display 16. For example, as shown in FIG. 28, the AIAA area 820 includes a circular identifier 826 identifying an object within the AIAA area 820.

In some embodiments, block 564 may direct the analyzer processor 100 to cause the identifiers to include indicators of which type of object is being identified. For example, for an object which is included in the first object score record 680 having a property identifier field 682 set to 3, block 564 may direct the analyzer processor 100 to cause the identifier to be red whereas for an object from the second object score record having a property identifier field set to 4, block 564 may direct the analyzer processor 100 to cause the identifier to be another colour, such as green, for example.

In various embodiments, the user may interact with the display 16 to provide user input to confirm, modify and/or reject the objects identified in the AIAA area 820. In some embodiments, the user may identify additional objects within the AIAA area 820. Block 566 of the flowchart 560 may direct the analyzer processor 100 to receive the user input and to generate a user confirmed record 880 as shown in FIG. 29 including, for example, object x and y coordinate fields 882 and 884 for identifying a first object and an associated object property identifier field 886 for storing an identifier identifying the type of object or property that the user confirmed to relate to the object. In various embodiments, the user confirmed record 880 may include a plurality of object coordinates and associated property identifiers representing all of the objects identified by the user. In various embodiments, block 566 may direct the analyzer processor 100 to store the user confirmed record 880 in the location 154 of the storage memory 104.

In various embodiments, the flowchart 560 shown in FIG. 19 may be executed for various subject sample image elements, taken in order from the final sorted objects record 800 shown in FIG. 27, generally as described above, such that a plurality of user confirmed records having format generally similar to the user confirmed record 880 may be stored in the location 154 of the storage memory 104. In some embodiments, as described above, the user may choose to end execution of the flowchart 560 and the analyzer processor 100 may proceed to block 212.

In various embodiments, block 212 of the flowchart 200 shown in FIG. 4 may direct the analyzer processor 100 to cause object based user input to be used to update the one or more functions. For example, in some embodiments, block 212 may direct the analyzer processor 100 to update the object identifying neural networks stored in the location 142 of the storage memory 104 shown in FIG. 3 based on the user confirmed records (including the user confirmed record 880 shown in FIG. 29, for example) stored in the location 154 of the storage memory 104.

In some embodiments, block 212 may direct the analyzer processor 100 to cause the object identifying neural networks to be trained from scratch, generally in the same way as they were initially trained but now including the new information from the user confirmed records. Alternatively, in some embodiments, old networks may be used as starting points (instead of random-initialized or other default-initialized networks), with a learning rate parameter chosen suitably.

VARIOUS EMBODIMENTS

In some embodiments, an image analyzer generally similar to the image analyzer 12 may be configured to execute the flowchart 200 shown in FIG. 4 with respect to only one type of sample image element. For example, in some embodiments, the image analyzer may be configured to execute the flowchart 200 shown in FIG. 4 analyzing, displaying, and receiving user input for only pixel squares or only objects.

In some embodiments, the image analyzer 12 may be configured to execute the flowchart 200 shown in FIG. 4 for more than one type of sample image element but blocks 208, 210, and 212 of the flowchart 200 may be executed with respect to only one type of sample image element at a time, such that the final sorted records list only one type of sample image element and a user may review and provide user input for only one type of sample image element at a time. For example, in some embodiments, implementations of blocks 208, 210, and 212 may be executed for pixel squares only or for objects only. In some embodiments, this separation of review sessions may allow a user to be able to review similar types of images when providing user input and this may improve their speed and/or accuracy during their review.

In some embodiments, blocks 208, 210, and 212 may be executed for different types of sample image elements, such that both pixel squares and objects are sorted into a single final list and shown to the user during their review. For example, in some embodiments, execution of the flowchart 520 shown in FIG. 15 may result in generating a final sorted record including both pixel square identifiers and object identifiers. In various embodiments, this may facilitate a user being able to easily review meaningful samples for training multiple relevant neural networks in a single session. In various embodiments, speed may be improved by automating the annotation, and/or accuracy may be improved by "forcing" the user to concentrate on one small area at a time.

In some embodiments, the one or more functions may include further or alternative neural networks for determining respective related scores representing levels of confidence that an image element represents further or alternative sample properties. In various embodiments, such sample properties, which may be helpful for pathology, may be analyzed using a system generally similar to the system 10 as shown in FIG. 1.

For example, in various embodiments, a system may be configured to analyze, identify, and/or quantify various objects, in addition to or alternatively to nuclei, mitoses and cells expressing Ki-67. For example, unbiased estimates of neuron counts within substantia nigra may be useful for pathology, including experimental Parkinson's disease models and gene-function studies. Accordingly, in various embodiments, any or all of the following sample properties may be analyzed in a system generally similar to the system 10 described herein and shown in FIG. 1.

1. All tissue (pixel squares)
   a. Substantia nigra (pixel squares)
      i. Tyrosine hydroxylase+ neuron cell bodies (object)

In various embodiments, the indentations shown above may indicate parent child relationships for various properties. For example, the property, "Substantia nigra" may be analyzed only for pixels associated with the property, "All tissue", and "Tyrosine hydroxylase+ neuron cell bodies" may be analyzed only for pixels associated with the property "Substantia nigra".

In various embodiments, additional or alternative sample properties may be analyzed in a system generally similar to the system 10 described herein and shown in FIG. 1. For example, in some embodiments, the image analyzer 12 may be configured to apply a tumor epithelial tissue identifying neural network to the sample image 80 to determine scores for pixel squares representing a level of confidence that the pixel squares "represent tumor epithelial tissue". In some embodiments, the image analyzer 12 may be configured to also apply an immune cell object identifying neural network for identifying immune cells within tumor epithelial tissue and outside tumor epithelial tissue.

In some embodiments, the flowchart 560 shown in FIG. 19 may include code for directing the analyzer processor 100 to proceed to block 212 of the flowchart 200 shown in FIG. 4 without receiving a user end message. For example, in some embodiments, the flowchart 560 may include a block of codes that directs the analyzer processor 100 to proceed to block 212 when all of the pixel squares listed in the final sorted pixel squares record 540 have been considered or when a threshold number of pixel squares in the final sorted pixel squares record 540 have been considered.

In some embodiments, the analyzer processor 100 may be directed to proceed from block 210 to block 212 of the flowchart 200 shown in FIG. 4, such that training may be initiated, automatically after a reasonable/needed amount of data is labeled during execution of blocks 208 and 210. In some embodiments, for example, the flowchart 200 may include blocks of code for directing the analyzer processor 100 to proceed to block 212 and initiate training, using a semi-automated process where proceeding to block 212 and initiating training is suggested to the user and the user accepts it. In some embodiments, when the user has added/confirmed enough new data, training could be suggested. For example, the flowchart 200 may include a block of code directing the analyzer processor 100 to suggest proceeding to block 212 and training when a count of user confirmed sample image elements representing any particular sample property (including background) has grown by a threshold amount, such as, for example by at least 10%.

In some embodiments, various functionality provided by the image analyzer 12 as described herein may be provided by separate virtual or physical devices and/or systems. For example, in some embodiments, any or all of blocks 202, 204, 206, 208, 210, and/or 212 may be executed at least in part on separate physical or virtual machines. For example, in some embodiments, an AI inference virtual machine may be configured to apply one or more neural networks to a sample image as described in connection with block 204 of the flowchart 200, and an AI training virtual machine may be configured to train one or more neural networks as described in connection with block 212. In such embodiments, block 204 may direct the analyzer processor 100 to produce signals for causing the one or more neural networks to be applied and/or block 212 may direct the analyzer processor 100 to produce signals for causing the neural networks to be trained.

In some embodiments, more than two sorted sample image element records (such as, for example, including the first and second sorted pixel squares records 440 and 500) may be incorporated into a final list, generally as described herein with reference to the flowchart 520 shown in FIG. 15. In such embodiments, block 524 may direct the analyzer processor 100 to identify subject sample image elements in order and/or alternatingly from each of the sorted sample image element records. For example, in some embodiments, first, a first listed entry from each of the records may be identified as the subject sample image element and/or included in the final list, next a second listed entry from each of the records may be identified as the subject sample image element, next a third listed entry from each of the records may be identified as the subject sample image element and so on.

In some embodiments, the user may provide at least one size multiplier, such as a width multiplier and a height multiplier, that may be used to determine the AIAA area size based on the subimage. In such embodiments, the flowchart 200 may include a block of codes for directing the analyzer processor 100 to receive user defined multipliers to be used to determine the AIAA area width and height based on the subimage. In such embodiments, the block of codes may direct the analyzer processor 100 to store the user defined multipliers in the storage memory 104 and blocks included in the flowchart 200 may direct the analyzer processor 100 to retrieve the user defined multipliers and multiply the subimage height and width to determine the AIAA area height and width before using that information as described herein.

In some embodiments, a user may specify the size of the AIAA area directly, in μm for example. In such embodiments, the flowchart 200 may include a block of codes for directing the analyzer processor 100 to receive a user defined AIAA area width and height. In such embodiments, the block of codes may direct the analyzer processor 100 to store the user defined AIAA area width and height in the storage memory 104 and block 208 of the flowchart 200 may direct the analyzer processor 100 to retrieve and use the user defined AIAA area width when causing the AIAA area to be displayed to the user.

In some embodiments, the first object score record 680 and/or other records listing objects may include additional or alternative object associated parameters to those shown in FIG. 23. For example, in some embodiments, the objects may vary in size and the first object score record 680 may include, for each set of object coordinates x and y, one or more associated size fields for storing size parameters for the identified object. For example, in some embodiments, the first object score record 680 may include a width and a height field, or a radius field for each of the objects listed therein. In various embodiments, these size field(s) may be included in the final sorted objects record 800 and/or used to determine the AIAA area size when the analyzer processor 100 generates the final list and/or causes the AIAA area to be displayed to the user.

In some embodiments, a single neural network may be configured to detect multiple object classes (such as, nuclei and mitoses, for example) at the same time.

In various embodiments, the property specific confidence scores may be determined in various alternative or additional ways. For example, in some embodiments, for each of the sample properties, K>1 models may be trained, trying to ensure that the models end up being different from each other. For example, each model may be trained using 90% of the available training data, but a different 90% for each model. Next, the K models may be applied to run inference separately on the sample image 80 and the property specific confidence score may be generated as a measure of where there is the most disagreement between the K models. In some embodiments, the "most disagreement" may be determined differently for semantic segmentation compared to object detection. For semantic segmentation (e.g., analysis of pixel squares), in some embodiments, generating the property specific confidence score may involve determining a mean absolute (or squared) difference between the results from the K models for each sample image element.

In various embodiments, the property specific confidence scores may be determined using "dropout" based methods to measure uncertainty. For example, a variant such as DropBlock, which is a form of structured dropout, may be used. For example, the property specific confidence scores may be determined by measuring how much a neural network output changes when generally contiguous regions of feature maps are dropped out.

In some embodiments, the flowchart 560 shown in FIG. 19 may include a block of codes for directing the analyzer processor 100 to facilitate a user declining to provide user input for a displayed AIAA area. In such embodiments, the block may direct the analyzer processor 100 to receive a user declined message indicating that the user does not wish to provide user input for the displayed AIAA area and the block may direct the analyzer processor 100 to, in response to receiving the user declined message, identify a next subject sample image element for display, such as, for example, by proceeding to block 562 of the flowchart 560 shown in FIG. 19.

In various embodiments, other pixel based sample image elements may be used in analysis generally as described above having regard to the pixel squares. For example, in some embodiments, other shaped groups of pixels may be used. For example, in some embodiments, a pixel rectangle may be used generally as described herein regarding pixel squares. In some embodiments, single pixels may each act as the sample image elements.

In some embodiments, a pixel square may have alternative pixel dimensions to 10 pixels×10 pixels, including, for example, decimal or fractional pixel dimensions. In some embodiments, a pixel square acting as a sample image element may have dimensions of, by way of example only, 10.2 pixels×10.2 pixels.

In some embodiments, the dimensions of a pixel square may be set such that an integer number of pixel squares fit within a subimage. In various embodiments, the decimal pixel dimensions of a pixel square may facilitate the pixel square dimensions being set in micrometers, which may be desirable, for example, when a user sets a subimage size in micrometers, to facilitate the number of pixel squares in the subimage being an integer. In various embodiments, the pixel square including fractional or decimal pixels may be accomplished using interpolation, such as for example, bilinear interpolation.

In some embodiments, pixel dimensions may be chosen such that 255 or 31 pixel squares fit within a subimage, for example.

In various embodiments, the object identifying neural networks may be configured to take as inputs pixel squares, instead of individual pixels. In various embodiments, causing the object identifying neural networks to be applied may involve causing subimages of the sample image to be used as inputs for the object identifying neural networks.

As discussed above, in some embodiments, when determining sample properties to associate with pixel squares based on pixel specific user input during training, pixel squares of the AIAA area of the sample image may be defined or drawn differently than they were when the one or more functions were applied to the sample image to determine the plurality of property specific confidence related scores. In some embodiments, the user may have changed settings, and so the pixel square size pertaining to the previously obtained property specific confidence scores may be different than that used in the training process.

In some embodiments, block 206 of the flowchart 200 shown in FIG. 4 may include blocks of code for directing the analyzer processor 100 to generate additional or alternative sorted lists of sample image elements.

Figure 30:
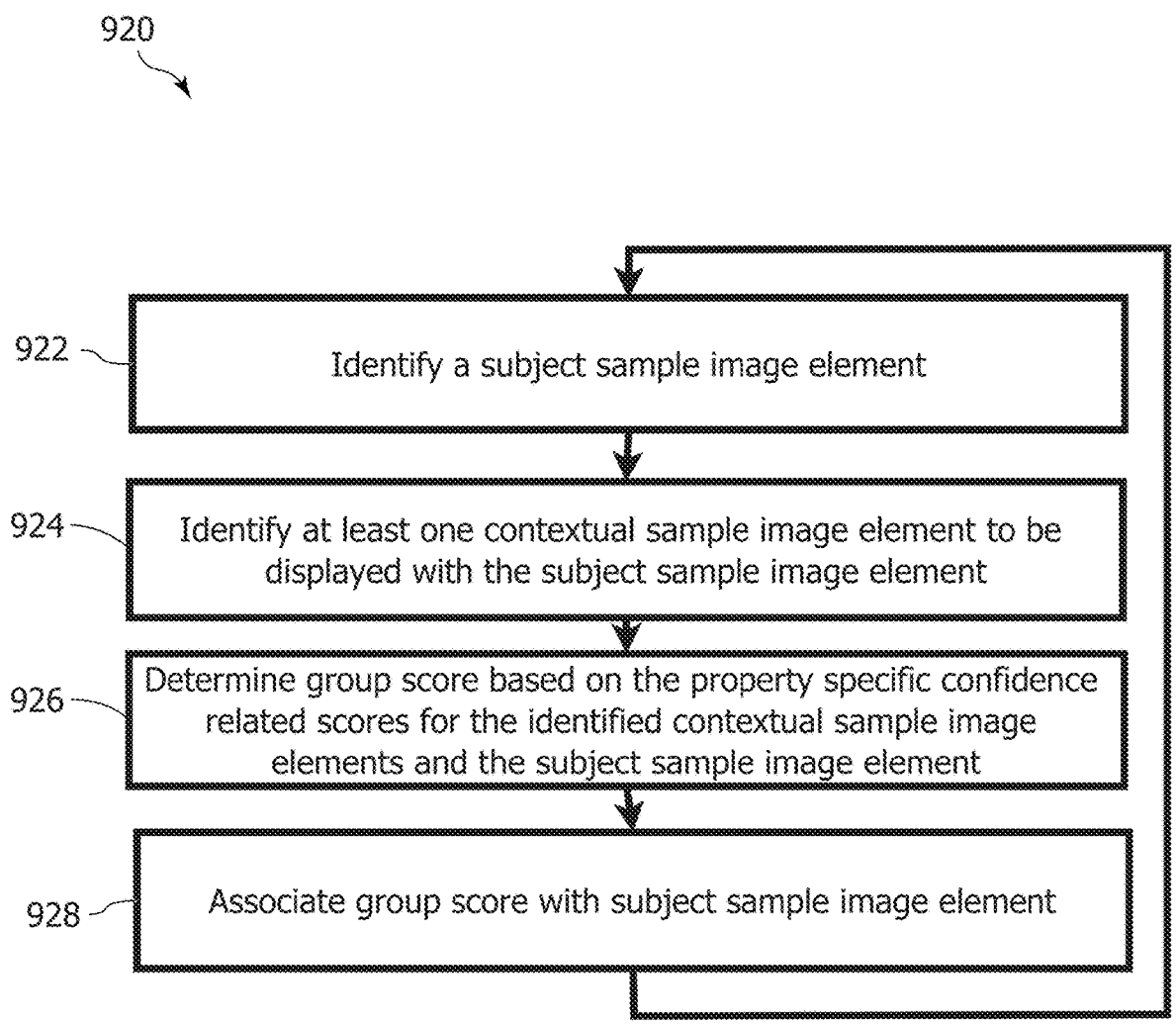
FIG. 30 is a flowchart depicting blocks of code that may be included in the flowchart shown in FIG. 4, in accordance with various embodiments.

For example, in some embodiments, block 206 of the flowchart 200 shown in FIG. 4 may include blocks of code for directing the analyzer processor 100 to consider property specific confidence related scores for more than one sample image element included in an AIAA area to be displayed to the user, when sorting. Referring now to FIG. 30, there is shown a flowchart 920 depicting blocks of code that may be included in the block 206 in accordance with various embodiments.

The blocks included in the flowchart 920 may direct the analyzer processor 100 to generate a sorted list of sample image elements based on group scores.

Referring to FIG. 30, the flowchart 920 begins with block 922 which directs the analyzer processor 100 to identify a subject sample image element. In some embodiments, the flowchart 920 may be executed for object elements and so block 922 may direct the analyzer processor 100 to identify an object from the object score records stored in the location 146 of the storage memory 104, such as, from the first object score record 680 shown in FIG. 23, as the subject sample image element. In some embodiments, for example, for a first execution of block 922, block 922 may direct the analyzer processor 100 to identify a first object identified by the first object coordinate fields 684 and 686 in the first object score record 680 shown in FIG. 23 as the subject sample image element or subject object.

Block 924 then directs the analyzer processor 100 to identify at least one contextual sample image element to be displayed with the subject sample image element. In some embodiments, block 924 may direct the analyzer processor 100 to determine which other objects identified in the object score records stored in the location 146 of the storage memory 104 shown in FIG. 3 are within an AIAA area which will be displayed when the subject object is displayed to the user and to identify those objects as contextual objects. In some embodiments, block 924 may direct the analyzer processor 100 to determine, for each of the objects identified in the object score records, if the object is within a threshold proximity of the first object. In some embodiments, block 924 may direct the analyzer processor 100 to determine that an object is within the threshold proximity when $|x_1-x_2|<0.5*$width of the AIAA area for the subject object, and $|y_1-y_2|<0.5*$height of the AIAA area for the subject object, where the object and the subject object have coordinates $(x_1, y_1)$ and $(x_2, y_2)$ respectively. In various embodiments, when an object is determined to be within the threshold proximity, the object may be within the AIAA area of the subject object and thus may be identified as a contextual element to be displayed with the subject object.

Block 926 then directs the analyzer processor 100 to determine a group score based at least in part on the property specific confidence related score of the identified at least one contextual sample image element (if any was identified at block 924) and the sample image element. In some embodiments, block 926 may direct the analyzer processor 100 to determine the group score by comparing respective property specific confidence related scores associated with each of the identified at least one contextual sample image element and the sample image element.

For example, in some embodiments, block 926 may direct the analyzer processor 100 to generate the group score by determining an absolute difference value for each of the identified contextual objects and the subject object, the absolute difference value being the magnitude of the difference between the property specific confidence related score associated with each object and a property specific confidence related threshold for the object. In some embodiments, the absolute difference value may act as a property specific confidence related score since it represents a level of confidence that the object represents the associated sample property. Block 926 may direct the analyzer processor 100 to then compare the determined absolute difference values and choose one of the absolute difference values as a group score. For example, in some embodiments, block 926 may direct the analyzer processor 100 to use the minimum absolute difference value as the group score. In some embodiments, using the minimum absolute difference value as the group score may cause the group score to represent the sample image element that was most difficult to characterize. In various embodiments, this may be a good score to use in finding the easiest AIAA areas to be displayed to a user with a subject sample image element, as discussed in further detail below.

In various embodiments, if no contextual objects were identified at block 924, block 926 may direct the analyzer processor 100 to determine the group score as the absolute difference value for the subject object.

Figure 31:
FIG. 31 is a representation of an exemplary group score record that may be used in the system shown in FIG. 1, in accordance with various embodiments.

Referring to FIG. 30, block 928 then directs the analyzer processor 100 to associate the group score with the subject sample image element. In some embodiments, block 928 may direct the analyzer processor 100 to generate a group score record 960 as shown in FIG. 31. Block 928 may direct the analyzer processor 100 to add to the group score record 960 first object x and y coordinate fields 962 and 964 for storing x and y coordinates for the subject object and an associated first group score field 966 for storing the determined group score. In various embodiments, block 928 may direct the analyzer processor 100 to add an associated first object property identifier field 968 for storing an identifier identifying the property associated with the object identified by the coordinate fields 962 and 964. In various embodiments, block 928 may direct the analyzer processor 100 to store the group score record 960 in the location 158 of the storage memory 104 shown in FIG. 3.

After block 928 has completed, the analyzer processor 100 may be directed back to block 922 which directs the analyzer processor 100 to identify a next subject sample image element. In some embodiments, block 922 may direct the analyzer processor 100 to identify an object included in the object score records stored in the location 146 of the storage memory 104 that has not been yet identified as a subject sample image element. For example, in some embodiments, block 922 may direct the analyzer processor 100 to identify the next object listed in the first object score record 680. In some embodiments, if all of the objects listed in the first object score record 680 have been considered, block 922 may direct the analyzer processor 100 to identify a first object from another object score record stored in the location 146 of the storage memory 104 shown in FIG. 3. In various embodiments, blocks 924 to 928 of the flowchart 920 may be executed for each object identified in the object score records stored in the location 146 of the storage memory 104, such that object coordinates and associated group scores are added to the group score record 960 for each object identified in the object score records stored in the location 146.

In various embodiments, the flowchart 920 may end when all of the objects identified in the object score records stored in the location 146 of the storage memory 104 have been considered and respective group scores have been added to the group score record 960. In some embodiments, block 206 may include code for directing the analyzer processor 100 to sort the objects listed in the group score record 960 based on the associated group scores. In various embodiments, the code may direct the analyzer processor 100 to store the sorted group score record in the location 150 of the storage memory 104.

In some embodiments, the sorted group score record may act as one of the sorted lists of sample image elements that may be used when generating a final list.

In some embodiments, block 206 of the flowchart 200 shown in FIG. 10 may direct the analyzer processor 100 to generate at least one easy list including sample image elements sorted such that sample image elements which are least likely to be mischaracterized by the one or more functions are sorted ahead of other sample image elements. In some embodiments, including the easy list may keep the proportion of difficult sample image elements included in the training data from growing to be too large and may result in a better trained function or neural network.

For example, in some embodiments, block 206 may direct the analyzer processor 100 to sort the group score record 960 in descending order of group scores, such that the objects which will be displayed with the generally easiest AIAA areas are listed first for review by the user. In such embodiments, the group score sorted in descending order may act as an easy list.

In some embodiments, block 410 of the flowchart 400 shown in FIG. 10 may include code for incorporating one or more easy lists into the final list. For example, in some embodiments, block 410 may direct the analyzer processor 100 to generate a final list including a first easy sample image element taken from the group score record sorted in descending order, followed by two difficult sample image elements (e.g., a sample image element taken from the sorted positive score record 760 shown in FIG. 25 and the negative score record 780 shown in FIG. 26) and then three easy sample image elements, with the two difficult, then three easy pattern repeating such that the sample image elements are ordered generally as follows:

1. Pick a sample image element from an easy-sample image elements list (e.g., the group score record sorted in descending order)

2. Pick a sample image element from a first difficult sample image elements list (e.g., the barely-positive sample image elements list, such as the sorted positive score record 760 shown in FIG. 25)
3. Pick a sample image element from a second difficult sample image elements list (e.g., the barely-negative sample image elements list, such as the sorted negative score record 780 shown in FIG. 26)
4. Pick a sample image element from the easy-sample image elements list
5. Pick a sample image element from the easy-sample image elements list
6. Pick a sample image element from the easy-sample image elements list
7. Pick a sample image element from the first difficult sample image elements list
8. Pick a sample image element from the second difficult sample image elements list
9. Pick a sample image element from the easy-sample image elements list
10. Pick a sample image element from the easy-sample image elements list
11. Pick a sample image element from the easy-sample image elements list
12. Pick a sample image element from the first difficult sample image elements list
13. . . .

In various embodiments, other ratios of easy sample image elements to difficult sample image elements displayed to the user may be used. In some embodiments, the ratio may be greater than one, such that more easy sample image elements than difficult sample image elements are shown to the user. In some embodiments, the ratio may change as a function of position on the final list. In some embodiments, the proportion of easy samples may decrease as a position in the final list increases. In some embodiments, this may facilitate the user reviewing a relatively larger proportion of easy samples in the beginning of a new review session, which may help to improve training. In some embodiments, the ratio may change as a function of overall number of approved samples in the images being used for training. In some embodiments, the proportion of easy samples may decrease as the overall number of approved samples in the images being used for training increases. In some embodiments, this may facilitate the user reviewing a relatively larger proportion of easy samples in the beginning of a new project, which may help to improve training. For example, a project may involve training one or more functions for detection and counting of tyrosine hydroxylase+ neuron cell bodies within substantia nigra. In some embodiments, the project may take a long time to complete, such as weeks or months, for example.

In various embodiments, alternative or additional easy lists to the group score list may be generated and incorporated into the final list generally as described above.

In some embodiments, block 926 of the flowchart 920 shown in FIG. 30 may direct the analyzer processor 100 to use alternative or additional ways of determining a group score based at least in part on the property specific confidence related scores of the identified at least one contextual sample image element and the sample image element. For example, in some embodiments, block 926 may direct the analyzer processor 100 to determine a sum or average of property specific confidence related scores or absolute difference values for each of the contextual sample image elements (if any were identified) and the subject sample image element. Block 926 may direct the analyzer processor 100 to use a resulting sum as the group score. In such embodiments, the sample image elements may be sorted based on the group scores such that sample image elements that are most likely to have been mischaracterized are listed first and thus, the group score list may act not as an easy list but as a difficult list.

In various embodiments, the sample image 80 shown in FIGS. 2 and 6 is shown for exemplary purposes only. In various embodiments, the sample image 80 shown in FIGS. 2 and 6 may depict a portion of a larger sample image, which may be treated as discussed herein. For example, in some embodiments, the larger sample image may be about 312,500 pixels by 104,167 pixels.

In various embodiments, when an act is stated herein to be based on various elements, the act may be based at least in part on the elements and the act may be based on additional elements.

While specific embodiments of the invention have been described and illustrated, such embodiments should be considered illustrative of the invention only and not as limiting the invention as construed in accordance with the accompanying claims.

The invention claimed is:

1. A method of facilitating image analysis in pathology, the method comprising:
   receiving a sample image representing a sample for analysis in pathology, the sample image including a plurality of sample image elements;
   causing one or more functions to be applied to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property;
   sorting a set of sample image elements of the plurality of sample image elements based at least in part on the property specific confidence related scores associated with the set of sample image elements;
   producing signals for causing one or more of the set of sample image elements to be displayed to a user in an order based on the sorting;
   for each of the one or more sample image elements displayed, receiving user input; and
   causing the user input to be used to update the one or more functions.

2. The method of claim 1 wherein the user input includes a user-provided indication that the sample image element represents one of the one or more sample properties.

3. The method of claim 1 wherein the set of sample image elements includes two or more sample image elements and the one or more of the set of sample image elements displayed includes two or more of the set of sample image elements.

4. The method of claim 1 wherein producing signals for causing the one or more of the set of sample image elements to be displayed to the user comprises, for at least one of the one or more of the set of sample image elements to be displayed to the user, producing signals for causing at least one contextual sample image element proximate to the sample image element to be displayed to the user with the sample image element.

5. The method of claim 4 further comprising:
   for each of the contextual sample image elements, receiving contextual user input including a user-provided indication that the contextual sample image element represents one of the one or more sample properties; and causing the contextual user input to be used to update the one or more functions.

6. The method of claim 5 wherein sorting the set of sample image elements comprises, for at least one of the set of sample image elements:

identifying at least one contextual sample image element to be displayed with the sample image element; and determining a group score based at least in part on the property specific confidence related score of the identified at least one contextual sample image element and the sample image element; and wherein sorting the set of sample image elements comprises sorting based at least in part on the determined group scores.

7. The method of claim 6 wherein determining the group score comprises comparing respective property specific confidence related scores associated with each of the identified at least one contextual sample image element and the sample image element.

8. The method of claim 1 wherein causing the one or more functions to be applied to the sample image to determine the property specific confidence related scores comprises causing the one or more functions to determine more than one related property specific confidence related score associated with each of the sample image elements.

9. The method of claim 8 wherein the more than one related property specific confidence related scores associated with each of the sample image elements are associated with properties that are mutually exclusive.

10. The method of claim 8 wherein sorting the set of sample image elements comprises identifying, for each sample image element of the set of sample image elements, a largest property specific confidence related score of the more than one related property specific confidence related scores associated with the sample image element and sorting based at least in part on the largest property specific confidence related scores.

11. The method of claim 10 wherein sorting based at least in part on the largest property specific confidence related scores comprises sorting in ascending order of the largest property specific confidence related scores associated with each of the sample image elements and wherein producing signals for causing the one or more sample image elements to be displayed to the user comprises producing signals for causing sample image elements associated with lower largest property specific confidence related scores to be displayed first.

12. The method of claim 8 wherein sorting the set of sample image elements comprises identifying, for each sample image element of the set of sample image elements, a second largest property specific confidence related score of the more than one related property specific confidence related scores associated with the sample image element and sorting based at least in part on the second largest property specific confidence related scores.

13. The method of claim 12 wherein sorting based at least in part on the second largest property specific confidence related scores comprises sorting in descending order of the second largest property specific confidence related scores associated with each of the sample image elements and wherein producing signals for causing the one or more sample image elements to be displayed to the user comprises producing signals for causing sample image elements associated with higher second largest property specific confidence related scores to be displayed first.

14. The method of claim 1 wherein sorting the set of sample image elements comprises determining, for each of the set of sample image elements, a difference between the property specific confidence related score associated with the sample image element and a property specific confidence related threshold and sorting the set of sample image elements based at least in part on the determined differences.

15. The method of claim 1 wherein sorting the set of sample image elements comprises sorting the set of sample image elements into a plurality of sorted lists and generating a final sorted list from the plurality of sorted lists, wherein generating the final sorted list comprises adding sample image elements to the final sorted list from each of the plurality of sorted lists.

16. The method of claim 15 wherein adding the sample image elements to the final sorted list from each of the plurality of sorted lists comprises adding the sample image elements alternatingly from each of the plurality of sorted lists.

17. The method of claim 1 comprising determining, for each of the set of sample image elements, whether the sample image element is within a threshold proximity of at least one earlier sorted sample image element.

18. The method of claim 1 wherein applying the one or more functions to the sample image to determine the plurality of property specific confidence related scores comprises, for each of the sample image elements, applying at least one of the one or more functions to a respective subimage included in the sample image and including the sample image element, and disregarding the rest of the sample image, each of the subimages having a width and height less than a width and height of the sample image.

19. The method of claim 18 wherein producing signals for causing the one or more sample image elements to be displayed to the user comprises producing signals for causing the one or more sample image elements to be displayed in one or more subimage size based review images showing a portion of the sample image, each of the one or more subimage size based review images having a width about 1 to 10 times the width of the subimages and having a height about 1 to 10 times the height of the subimages.

20. The method of claim 1 wherein producing signals for causing the one or more sample image elements to be displayed to the user comprises producing signals for causing at least one of the one or more sample image elements to be displayed in a sample image element size based review image showing a portion of the sample image having a width and a height about 10 to 20 times a diameter of the at least one of the one or more sample image elements.

21. The method of claim 1 wherein the one or more functions include one or more neural network functions and wherein causing the user input to be used to update the one or more functions comprises causing the user input to be used to train the one or more neural network functions.

22. The method of claim 1 wherein the sample image elements comprise sets of adjacent pixels.

23. The method of claim 1 wherein the sample image elements comprise groups of pixels identified as objects.

24. A system for facilitating image analysis in pathology, the system comprising at least one processor configured to:

receive a sample image representing a sample for analysis in pathology, the sample image including a plurality of sample image elements;

cause one or more functions to be applied to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property;
sort a set of sample image elements of the plurality of sample image elements based at least in part on the property specific confidence related scores associated with the set of sample image elements;
produce signals for causing one or more of the set of sample image elements to be displayed to a user in an order based on the sorting;
for each of the one or more sample image elements displayed, receive user input; and
cause the user input to be used to update the one or more functions.

25. The system of claim 24 wherein the at least one processor is configured to, for at least one of the one or more of the set of sample image elements to be displayed to the user, produce signals for causing at least one contextual sample image element proximate to the sample image element to be displayed to the user with the sample image element and wherein the at least one processor is configured to:
for each of the contextual sample image elements, receive contextual user input including a user-provided indication that the contextual sample image element represents one of the one or more sample properties; and
cause the contextual user input to be used to update the one or more functions.

26. The system of claim 24 wherein the at least one processor is configured to cause the one or more functions to determine more than one related property specific confidence related score associated with each of the sample image elements.

27. The system of claim 26 wherein the at least one processor is configured to identify, for each sample image element of the set of sample image elements, a largest property specific confidence related score of the more than one related property specific confidence related scores associated with the sample image element and sort based at least in part on the largest property specific confidence related scores.

28. The system of claim 26 wherein the at least one processor is configured to identify, for each sample image element of the set of sample image elements, a second largest property specific confidence related score of the more than one related property specific confidence related scores associated with the sample image element and sort based at least in part on the second largest property specific confidence related scores.

29. A non-transitory computer-readable medium having stored thereon codes that when executed by at least one processor cause the at least one processor to:
receive a sample image representing a sample for analysis in pathology, the sample image including a plurality of sample image elements;
cause one or more functions to be applied to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property;
sort a set of sample image elements of the plurality of sample image elements based at least in part on the property specific confidence related scores associated with the set of sample image elements;
produce signals for causing one or more of the set of sample image elements to be displayed to a user in an order based on the sorting;
for each of the one or more sample image elements displayed, receive user input; and
cause the user input to be used to update the one or more functions.

30. A system for facilitating image analysis in pathology, the system comprising:
means for receiving a sample image representing a sample for analysis in pathology, the sample image including a plurality of sample image elements;
means for causing one or more functions to be applied to the sample image to determine a plurality of property specific confidence related scores, each of the plurality of property specific confidence related scores associated with one of the plurality of sample image elements and a respective one of one or more sample properties, the property specific confidence related score representing a level of confidence that the associated sample image element represents the associated sample property;
means for sorting a set of sample image elements of the plurality of sample image elements based at least in part on the property specific confidence related scores associated with the set of sample image elements;
means for producing signals for causing one or more of the set of sample image elements to be displayed to a user in an order based on the sorting;
means for, for each of the one or more sample image elements displayed, receiving user input; and
means for causing the user input to be used to update the one or more functions.

* * * * *